United States Patent
Kim et al.

(10) Patent No.: US 7,293,224 B2
(45) Date of Patent: Nov. 6, 2007

(54) ENCODING/DECODING APPARATUS AND METHOD IN A CDMA MOBILE COMMUNICATION SYSTEM

(75) Inventors: Jae-Yoel Kim, Kunpo-shi (KR); Ho-Kyu Choi, Seoul (KR); Jae-Sung Jang, Kwachon-shi (KR); Youn-Sun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 992 days.

(21) Appl. No.: 10/101,352

(22) Filed: Mar. 19, 2002

(65) Prior Publication Data

US 2003/0026224 A1 Feb. 6, 2003

(30) Foreign Application Priority Data

| Mar. 20, 2001 | (KR) | ................................ 2001-14418 |
| Mar. 23, 2001 | (KR) | ................................ 2001-15294 |
| Mar. 26, 2001 | (KR) | ................................ 2001-15787 |

(51) Int. Cl.
*H03M 13/03* (2006.01)
*H04B 7/216* (2006.01)

(52) U.S. Cl. ...................... 714/790; 714/786; 714/781; 370/342

(58) Field of Classification Search ................. 714/790, 714/786, 781; 370/735, 342, 209
See application file for complete search history.

(56) References Cited

U.S. PATENT DOCUMENTS

| 6,064,663 | A | * | 5/2000 | Honkasalo et al. | .......... 370/335 |
| 6,084,904 | A | * | 7/2000 | Wang et al. | ................. 375/130 |
| 6,147,964 | A | * | 11/2000 | Black et al. | ................. 370/209 |
| 6,353,626 | B1 | * | 3/2002 | Sunay et al. | ................. 375/130 |
| 6,366,778 | B1 | * | 4/2002 | Bender et al. | ............... 455/442 |
| 6,768,778 | B1 | * | 7/2004 | Chen et al. | ................. 375/262 |
| 6,888,804 | B1 | * | 5/2005 | Moon | ......................... 370/311 |

FOREIGN PATENT DOCUMENTS

WO  WO 01/03366  1/2001

OTHER PUBLICATIONS

European Search Report dated Nov. 4, 2003 issued in a counterpart application, namely, Appln. No. 02006293.1.
Samsung Electronics Co. Ltd.: "Dynamic Split Mode for TFCI", TSG-RAN Working Group 1 Meeting #17, Nov. 21-24, 2000, pp. 1-5.

(Continued)

*Primary Examiner*—Guy Lamarre
*Assistant Examiner*—Fritz Alphonse
(74) *Attorney, Agent, or Firm*—The Farrell Law Firm, P.C.

(57) ABSTRACT

An encoding method in a mobile communication system, for receiving 4 input information bits, encoding the 4 input information bits with different Walsh codes of length 16, and outputting a coded symbol stream having 24 coded symbols using a coded symbol stream having 16 coded symbols obtained by XORing the encoded input information bits by an XOR operator. The encoding method comprises repeating the coded symbol stream having 16 coded symbols once, and thus outputting a coded symbol stream having 32 coded symbols; and puncturing $0^{th}$, $1^{st}$, $2^{nd}$, $3^{rd}$, $4^{th}$, $5^{th}$, $6^{th}$ and $16^{th}$ symbols from the 32 coded symbols, and thus outputting the coded symbol stream having 24 coded symbols.

31 Claims, 9 Drawing Sheets

OTHER PUBLICATIONS

Insoo Sohn et al., "Performance Studies of Rate Matching for WCDMA Mobile Receiver", Vehicular Technology Conference Fall 2000, vol. 6, Sep. 24, 2000, pp. 2661-2665.

A. E. Brouwer and Tom Verhoeff, "An Updated Table of Minimum-Distance Bounds for Binary Linear Codes", IEEE Transactions on Information Theory, vol. 39, No. 2, Mar. 1993).

* cited by examiner

ENCODING/DECODING APPARATUS AND METHOD IN A CDMA MOBILE COMMUNICATION SYSTEM

PRIORITY

This application claims priority to an application entitled "Encoding/Decoding Apparatus and Method in a CDMA Mobile Communication System" filed in the Korean Industrial Property Office on Mar. 20, 2001 and assigned Serial No. 2001-14418, an application entitled "Encoding/Decoding Apparatus and Method in a CDMA Mobile Communication System" filed in the Korean Industrial Property Office on Mar. 23, 2001 and assigned Serial No. 2001-15294, and an application entitled "Encoding/Decoding Apparatus and Method in a CDMA Mobile Communication System" filed in the Korean Industrial Property Office on Mar. 26, 2001 and assigned Serial No. 2001-15787, the contents of all of which are hereby incorporated by reference.

BACKGROUND OF THE INVENTION

1. Field of the Invention

The present invention relates generally to an encoding/decoding apparatus and method in a CDMA (Code Division Multiple Access) mobile communication system, and in particular, to an apparatus and method for transmitting a reverse rate indicator channel (R-RICH) used in a synchronous mobile communication system.

2. Description of the Related Art

In general, a reverse supplemental channel (R-SCH) fundamentally supports a variable rate transmission scheme. In the "variable rate transmission scheme", a mobile station varies its transmission rate arbitrarily. Generally, a change in a data rate causes a change in a code rate of error correcting codes used in constructing a frame, a symbol repetition frequency, and a length and type of Walsh codes for spreading. Therefore, the mobile station should inform a base station of a data rate of the currently transmitted reverse supplemental channel, so that a base station receiver can correctly receive the reverse supplemental channel. A channel defined for this use is called a reverse rate indicator channel (R-RICH).

The number of available data rates at which the mobile station can transmit data over the reverse supplemental channel depends upon the number of available reverse supplemental channels that the mobile station can use at the same time. The number of the reverse supplemental channels is determined by the base station considering an amount of data to be transmitted over a reverse link during call setup, and then reported to the mobile station. Therefore, the number of information bits transmitted over the reverse rate indictor channel varies depending on the number of the reverse supplemental channels. That is, when the number of the reverse supplemental channels is 1, the mobile station informs a reverse data rate using 4 bits. Further, when the number of the reverse supplemental channels is 2, the mobile station informs the reverse data rate using 7 bits. Since the number of the available reverse supplemental channels that can be simultaneously used by the mobile station cannot be changed until a separate command is received from the base station, the mobile station transmits either 4-bit information or 7-bit information over the reverse rate indicator channel. That is, the mobile station will never transmit both the 4-bit information and the 7-bit information. Conventionally, a (24,4) or a (24,7) code is defined as an error correcting code to be used in the reverse rate indicator channel.

FIG. 1 illustrates a structure of an R-RICH transmitter. Referring to FIG. 1, an encoder 100 encodes a 4-bit or 7-bit input rate indicator and outputs 24 coded symbols. A symbol repeater 110 repeats 16 times the 24 coded symbols provided from the encoder 100. A signal mapper 120 performs signal mapping on the coded symbols output from the symbol repeater 110 by mapping 0 to 1 and 1 to −1. A spreader 130 spreads the signal-mapped symbols.

As illustrated in FIG. 1, the rate indicator having 4 bits or 7 bits, and encoded into 24 coded symbols before transmission. When errors occur during transmission of the rate indicator encoded into the coded symbols, the rate indicator may incorrectly indicate the code rate of the corresponding reverse supplemental channel, the symbol repetition frequency, and the length and type of the spread Walsh code. As a result, the receiver cannot correctly analyze the reverse supplemental channel. Therefore, the rate indicator should be encoded by a (24,4) or a (24,7) encoder having good performance. In addition, the rate indicator should be decoded as fast as possible in order to analyze the corresponding supplemental channel.

SUMMARY OF THE INVENTION

It is, therefore, an object of the present invention to provide a rate indicator encoding apparatus and method having optimal performance.

It is another object of the present invention to provide a rate indicator encoding apparatus and method having a minimum complexity.

It is further another object of the present invention to provide an apparatus and method for minimizing hardware complexity by using a method of puncturing an extended first order Reed-Muller code so that an inverse fast Hadamard transform is performed in a decoding process.

It is yet another object of the present invention to provide an apparatus and method for using an optimal codeword by using a method of puncturing an extended first order Reed-Muller code so that an inverse fast Hadamard transform is performed in a decoding process.

It is still another object of the present invention to provide an apparatus and method for minimizing hardware complexity by minimizing a length of an orthogonal code before puncturing.

It is still another object of the present invention provide an apparatus and method for not only minimizing hardware complexity by puncturing an extended orthogonal code, but also generating an optimal code in terms of error correcting performance.

It is still another object of the present invention to provide an apparatus and method for minimizing hardware complexity and performing both (24,4) encoding and (24,7) encoding to generate an optimal code in terms of error correcting performance.

In accordance with one aspect of the present invention, there is provided an encoding method in a mobile communication system, for receiving 4 input information bits, encoding the 4 input information bits with different Walsh codes of length 16, and outputting a coded symbol stream having 24 coded symbols using a coded symbol stream having 16 coded symbols obtained by XORing the encoded input information bits by an XOR operator. The encoding method comprises repeating the coded symbol stream having 16 coded symbols once, and thus outputting a coded symbol stream having 32 coded symbols; and puncturing $0^{th}$, $1^{st}$, $2^{nd}$, $3^{rd}$, $4^{th}$, $5^{th}$, $6^{th}$ and $16^{th}$ symbols from the 32 coded symbols, and thus outputting the coded symbol stream having 24 coded symbols.

In accordance with another aspect of the present invention, there is provided an encoding method in a mobile communication system, for receiving 7 input information bits, encoding the 7 input information bits with different Walsh codes of length 32 and different masks of length 32, and outputting a coded symbol stream having 24 coded symbols using a coded symbol stream having 32 coded symbols obtained by XORing the encoded input information bits by an XOR operator. The encoding method punctures $0^{th}$, $4^{th}$, $8^{th}$, $12^{th}$, $16^{th}$, $20^{th}$, $24^{th}$ and $28^{th}$ symbols from the 32 coded symbols, and thus outputting the coded symbol stream having 24 coded symbols.

In accordance with further another aspect of the present invention, there is provided an encoding apparatus in a mobile communication system, for receiving 4 or 7 input information bits, encoding the 4 or 7 input information bits with different Walsh codes or masks, all having a length 16 or 32, and outputting a coded symbol stream having 24 coded symbols. The encoding apparatus comprises a controller for determining whether the number of input information bits is 4 or 7, and controlling an encoding operation according to the determination result; a Walsh code generator for selectively generating 5 different Walsh codes of length 16 or 32 under the control of the controller; a mask generator for selectively generating 2 different masks of length 16 or 32 under the control of the controller; multipliers for multiplying the 4 or 7 input information bits by the Walsh codes from the Walsh code generator and the masks from the mask generator on a one-to-one basis, and outputting coded symbol streams each having 16 or 32 coded symbols; an XOR operator for XORing the coded symbol streams from the multipliers and outputting one coded symbol stream; a repeater for repeating the coded symbol stream from the XOR operator a predetermined number of times under the control of the controller, and outputting a coded symbol stream having 32 coded symbols; a memory for storing 8 puncturing positions corresponding to the 4 input information bits and 8 puncturing positions corresponding to the 7 input information bits; and a puncturer for receiving the coded symbol stream having 32 coded symbols from the repeater, puncturing coded symbols in the 8 puncturing positions read from the memory among the 32 coded symbols under the control of the controller, and outputting the coded symbol stream having 24 coded symbols.

In accordance with yet another aspect of the present invention, there is provided an encoding apparatus in a mobile communication system, for receiving 4 or 7 input information bits, encoding the 4 or 7 input information bits with different Walsh codes or masks, all having a length of 32, and outputting a coded symbol stream having 24 coded symbols. The encoding apparatus comprises a controller for determining whether the number of input information bits is 4 or 7, and controlling an encoding operation according to the determination result; a Walsh code generator for selectively generating 5 different Walsh codes of length 32; a mask generator for selectively generating 2 different masks of length 32; multipliers for multiplying the 4 or 7 input information bits by the Walsh codes from the Walsh code generator and the masks from the mask generator on a one-to-one basis, and outputting coded symbol streams each having 32 coded symbols; an XOR operator for XORing the coded symbol streams from the multipliers and outputting one coded symbol stream; a memory for storing 8 puncturing positions corresponding to the 4 input information bits and 8 puncturing positions corresponding to the 7 input information bits; and a puncturer for receiving the coded symbol stream having 32 coded symbols from the XOR operator, puncturing coded symbols in the 8 puncturing positions read from the memory among the 32 coded symbols under the control of the controller, and outputting the coded symbol stream having 24 coded symbols.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
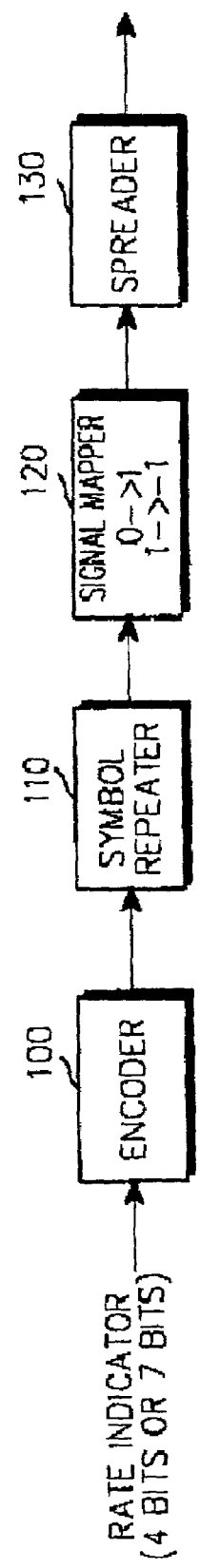
FIG. 1 illustrates a structure of an R-RICH (Reverse Rate Indicator Channel) transmitter in a general CDMA mobile communication system.

A preferred embodiment of the present invention will be described herein below with reference to the accompanying drawings. In the following description, well-known functions or constructions are not described in detail since they would obscure the invention in unnecessary detail.

In general, Hamming distance distribution for codewords of the error correcting codes serve as a measure indicating the performance of linear error correcting codes. The "Hamming distance" indicates the number of non-zero symbols in a codeword. That is, for a certain codeword '0111', the number of 1's included in the codeword is 3, so the Hamming distance is 3. The least value among the Hamming distance values is called a "minimum distance $d_{min}$", and an increase in the minimum distance of the codeword improves the error correcting performance of the error correcting codes. In other words, the "optimal code" means a code having the optimal error correcting performance. This is disclosed in detail in a paper, *The Theory of Error-Correcting Codes*, F. J. Macwilliams, N. J. A. Sloane, North-Holland. In addition, a paper, *An Updated Table of Mini-* mum-Distance Bounds for Binary Linear Codes (A. E. Brouwer and Tom Verhoeff, IEEE Transactions on information Theory, VOL 39, NO. 2, MARCH 1993), discloses an intercede minimum distance, which depends on the input and output values of the binary linear codes for the optimal code.

A (24,4) encoder or (24,7) encoder is typically used as an encoder for encoding the rate indicator. According to the second paper stated above, the (24,4) linear encoder for receiving 4 input bits and outputting 24 symbols has a minimum distance of 12, while the (24,7) linear encoder for receiving 7 input bits and outputting 24 codes has a minimum distance of 10.

First, a description will be made of the (24,4) encoder for encoding the rate indicator.

The (24,4) encoder provided by the invention is constructed to generate an optimal (24,4) code by repeating a (15,4) simplex code twice and then puncturing 6 symbols from the repeated code. Although there are many ways to create the (24,4) code, it is possible not only to minimize hardware complexity but also to create an optimal codeword by utilizing a method of puncturing a first order Reed-Muller code according to an embodiment of the present invention. It is possible to minimize the hardware complexity by minimizing a length of the simplex code before puncturing. Further, it is possible not only to minimize the hardware complexity by puncturing the simplex code, but also to create an optimal code in terms of error correcting performance. It will be assumed that the embodiment of the present invention generates an error correcting code using the simplex code.

The (24,4) encoder outputs a codeword created by generating simplex code symbols of length 30 by repeating twice 15 coded symbols output from a (15,4) simplex code generator and then puncturing 6 symbols from the simplex code symbols. A change in the puncturing positions where the 6 symbols are punctured from the repeated simplex code symbols of length 30 causes a change in the minimum distance $d_{mm}$ of the codeword. Therefore, in order to make a (24,4) encoder with excellent error correcting performance in the (15,4) simplex code, it is important to calculate the puncturing positions where the largest minimum distance can be obtained.

The 6 puncturing positions needed for generating an optimal (24,4) linear code can be calculated through experimentation. The simplest puncturing pattern is $\{0,1,2,3,4,5\}$. In this case, a transmitter and a receiver of the mobile communication system transmitting the 4 information bits using the encoding/decoding method according to the present invention should previously agree on the 6 puncturing positions. The puncturing positions are generally defined in a communication protocol. Alternatively, the transmitter may previously provide information on the puncturing positions. A method for encoding the optimal (24,4) code according to the present invention will be described with reference to FIG. 2.

Figure 2:
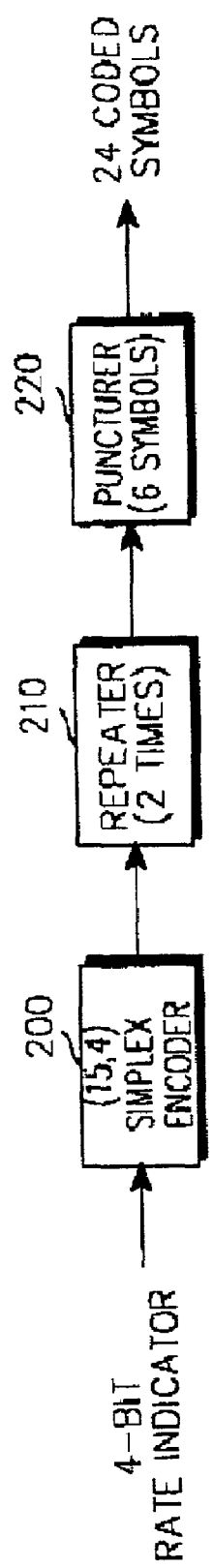
FIG. 2 illustrates a structure of an optimal (24,4) encoder in a CDMA mobile communication system according to an embodiment of the present invention.

FIG. 2 illustrates a structure of an encoder included in a transmitter according to an embodiment of the present invention. Referring to FIG. 2, 4 input information bits a0, a1, a2 and a3 are applied to a (15,4) simplex encoder 200. Here, the 4 input information bits a0, a1, a2 and a3 constitute a rate indicator. The simplex encoder (or Reed-Muller encoder) 200 encodes the 4 input information bits a0, a1, a2 and a3, and outputs coded symbols (or a coded symbol stream) of length 15. The coded symbols constitute a simplex code. The 15 coded symbols are provided to a repeater 210. The repeater 210 outputs 30 coded symbols by repeating the received 15 coded symbols twice. Upon receiving the 30 coded symbols, a puncturer 220 punctures $0^{th}$, $1^{st}$, $2^{nd}$, $3^{rd}$, $4^{th}$ and $5^{th}$ symbols in the 6 optimal puncturing positions from the 30 coded symbols and outputs 24 coded symbols.

A general code theory defines a generating matrix in order to show a mapping relation between the input information and the coded symbols. When the symbol repetition and puncturing are included, a generating matrix for a final (24,4) encoder is represented by $$M = \begin{bmatrix} 101010101101010101010101 \\ 100110011011001100110011 \\ 100001111000111100001111 \\ 011111111000000011111111 \end{bmatrix} \quad \text{Equation 1}$$

The generating matrix of Equation 1 selects 24 symbols in a first row if the first input information bit among the 4 input information bits is 1, and selects no input information bit if the first input information bit is 0. The generating matrix selects 24 symbols in a second row if the second input information bit among the 4 input information bits is 1, and selects no input information bit if the second input information bit is 0. The generating matrix selects 24 symbols in a third row if the third input information bit among the 4 input information bits is 1, and selects no input information bit if the third input information bit is 0. The generating matrix selects 24 symbols in a fourth row if the fourth input information bit among the 4 input information bits is 1, and selects no input information bit if the fourth input information bit is 0.

Figure 7:
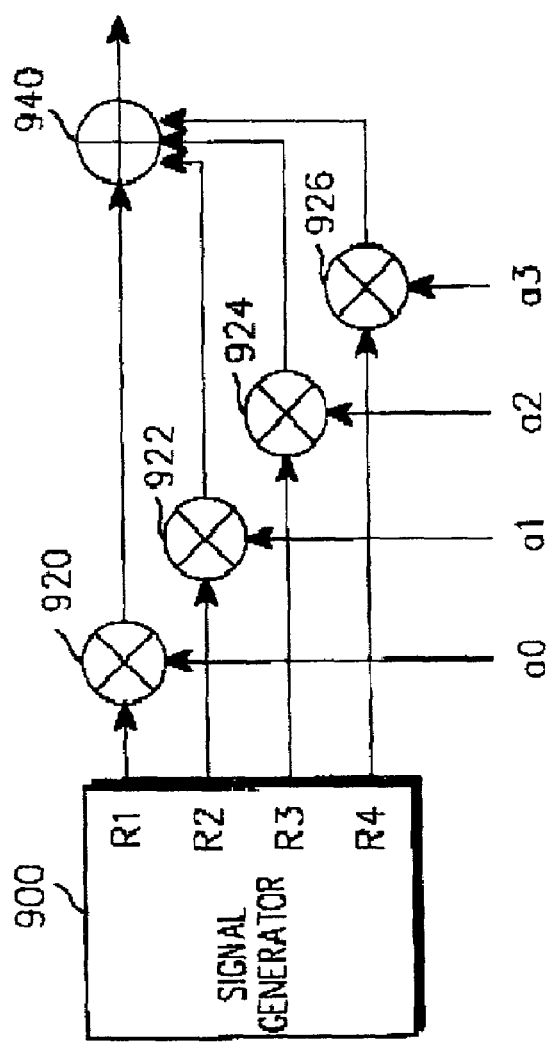
FIG. 7 illustrates a structure of a (24,4) encoder based on a generating matrix according to an embodiment of the present invention.

FIG. 7 illustrates a (24,4) encoder based on the above generating matrix. Referring to FIG. 7, of the input information bits a0-a3 having a value of 0 or 1, an input information bit a0 is applied to a multiplier 920, an input information bit a1 is applied to a multiplier 922, an input information bit a2 is applied to a multiplier 924, and an input information bit a3 is applied to a multiplier 926, respectively. At the same time, a signal generator 900 provides 4 symbol streams R1-R4 constituting the generating matrix, stored in a memory, to the multipliers 920-926, respectively. To be specific, the signal generator 900 reads a length-24 symbol stream R1=1010 1010 1101 0101 0101 0101 corresponding to the first row of the generating matrix, stored in the memory, and provides the read symbol stream R1 to the multiplier 920. The signal generator 900 reads a length-24 symbol stream R2=1001 1001 1011 0011 0011 0011 corresponding to the second row of the generating matrix, stored in the memory, and provides the read symbol stream R2 to the multiplier 922. The signal generator 900 reads a length-24 symbol stream R3=1000 0111 1000 1111 0000 1111 corresponding to the third row of the generating matrix, stored in the memory, and provides the read symbol stream R3 to the multiplier 924. Finally, the signal generator 900 reads a length-24 symbol stream R4=0111 1111 1000 0000 1111 0000 1111 corresponding to the fourth row of the generating matrix, stored in the memory, and provides the read symbol stream R4 to the multiplier 926. Then, the multiplier 920 multiplies the symbols of the symbol stream R1 by the input information bit a0, and outputs a symbol stream of length 24 to an XOR operator 940. The multiplier 922 multiplies the symbols of the symbol stream R2 by the input information bit a1, and outputs a symbol stream of length 24 to the XOR operator 940. The multiplier 924 multiplies the symbols of the symbol stream R3 by the input information bit a2, and outputs a symbol stream of length 24 to the XOR operator 940. The multiplier 926 multiplies the symbols of the symbol stream R4 by the input information bit a3, and outputs a symbol stream of length 24 to the XOR operator 940. The XOR operator 940 then XORs the 4 symbol streams of length 24 in a symbol unit, and outputs a coded symbol stream of length 24.

Next, a description will be made of the (24,7) encoder for encoding the rate indicator.

The (24,7) encoder provided by the invention is constructed to generate an optimal (24,7) code by puncturing 8 symbols from an extended orthogonal code obtained by spreading a codeword using 2 mask functions for a (32,5) orthogonal code (or first order Reed-Muller code).

Figure 3:
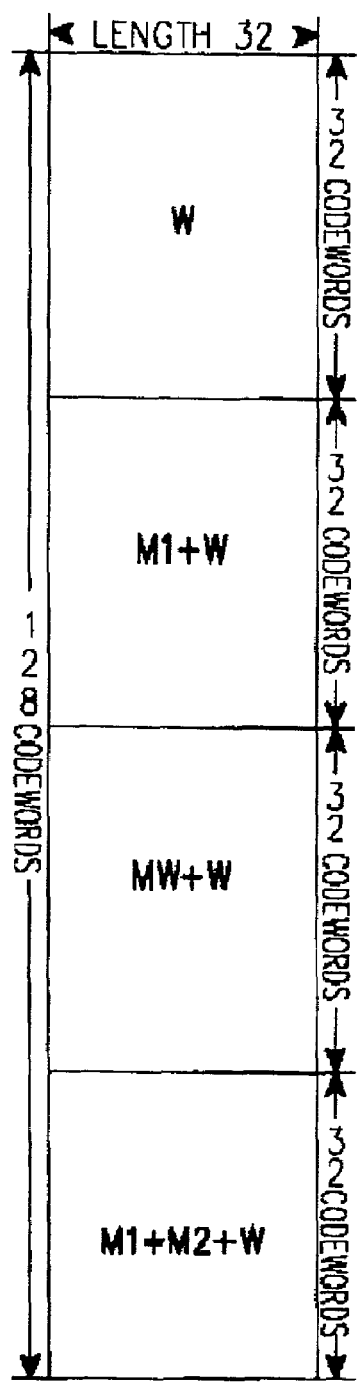
FIG. 3 illustrates a structure of a codeword according to an embodiment of the present invention.

FIG. 3 illustrates a structure of the extended orthogonal code. Referring to FIG. 3, when M1 and M2 are the 2 mask functions stated above, 32 orthogonal codewords W of length 32 are used for the upper 32 codewords, and 32 codewords (M1+W) determined by XORing the mask function M1 and the 32 orthogonal codewords W are used for the next 32 codewords. Further, 32 codewords (M2+W) determined by XORing the mask function M2 and the 32 orthogonal codewords W are used for the next 32 codewords, and 32 codewords (M1+M2+W) determined by XORing the mask function M1 and M2 and the 32 orthogonal codewords W are used for the last 32 codewords. Therefore, a total of $2^7=128$ codewords are used as the extended orthogonal codes. The 2 mask functions for optimizing a (24,7) code can be searched on experiment.

For example, the 2 mask functions M1 and M2 are as follows.

M1=0111 0111 0010 0100 0110 0000 0000 0000
M2=0010 0110 0101 0100 0101 0100 0100 0000

Although there are many ways to create the (24,7) linear code, it is possible not only to minimize hardware complexity but also to use an optimal codeword by utilizing a method of puncturing an extended first order Reed-Muller code according to an embodiment of the present invention. Further, it is possible to minimize the hardware complexity by minimizing a length of the orthogonal code before puncturing. In addition, it is possible not only to minimize the hardware complexity by puncturing the extended orthogonal code, but also to create an optimal code in terms of error correcting performance. It will be assumed that the embodiment of the present invention generates an error correcting code using the extended orthogonal code.

The (24,7) codeword is generated by puncturing 8 symbols from the 32 coded symbols output from a (32,7) extended code generator. Here, a change in the puncturing positions where the 8 symbols are punctured from the 32 extended coded symbols causes a change in the minimum distance $d_{min}$ of the codeword. Therefore, in order to make a (24,7) encoder with excellent error correcting performance in the (32,7) extended orthogonal code, it is important to calculate the puncturing positions where the largest minimum distance can be obtained.

The 8 puncturing positions needed for generating an optimal (24,7) linear code can be calculated through experimentation. The simplest puncturing pattern is {0,4,8,12,16,20,24,28}. In this case, a transmitter and a receiver of the mobile communication system transmitting the 7 information bits using the encoding/decoding method according to the present invention should previously agree on the 8 puncturing positions. The puncturing positions are generally defined in a communication protocol. Alternatively, the transmitter may previously provide information on the puncturing positions.

Figure 4:
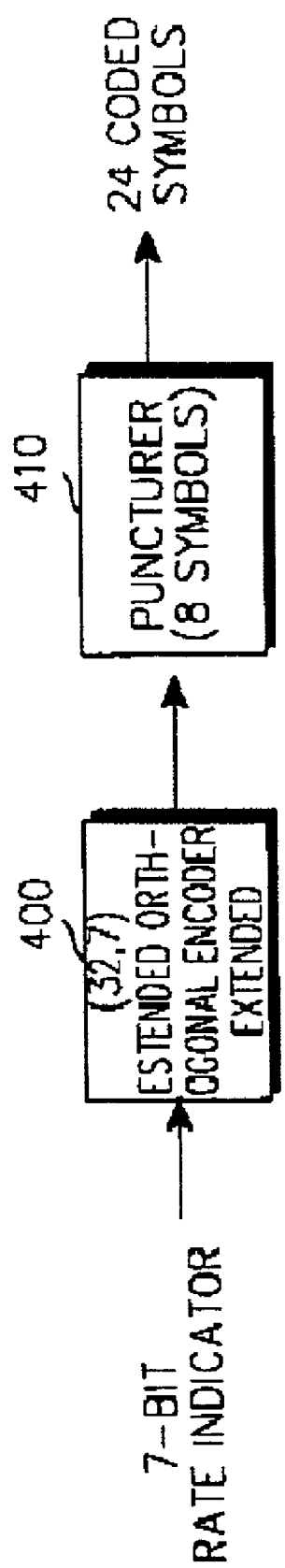
FIG. 4 illustrates a structure of an optimal (24,7) encoder in a CDMA mobile communication system according to an embodiment of the present invention.

FIG. 4 illustrates a structure of an optimal (24,7) encoder included in the transmitter according to an embodiment of the present invention. Referring to FIG. 4, 7 input information bits a0, a1, a2, a3, a4, a5 and a6 are applied to a (32,7) extended orthogonal encoder 400. Here, the 7 input information bits a0, a1, a2, a3, a4, a5 and a6 constitute a rate indicator. The extended orthogonal encoder 400 encodes the 7 input information bits a0, a1, a2, a3, a4, a5 and a6, and outputs coded symbols (or a coded symbol stream) of length 32. The 32 coded symbols output from the extended orthogonal encoder 400 are provided to a puncturer 410. The puncturer 410 punctures $0^{th}$, $4^{th}$, $8^{th}$, $12^{th}$, $16^{th}$, $20^{th}$, $24^{th}$ and $28^{th}$ symbols in the 8 optimal puncturing positions from the 32 coded symbols and outputs 24 coded symbols.

A general code theory defines a generating matrix to show a mapping relation between the input information and the coded symbols. When the symbol puncturing is included, a generating matrix for a final (24,7) encoder is represented by $$M = \begin{bmatrix} 101101101101101101101101 \\ 011011011011011011011011 \\ 000111000111000111000111 \\ 000000111111000000111111 \\ 000000000000111111111111 \\ 111111010100110000000000 \\ 010110101100101100100000 \end{bmatrix} \quad \text{Equation 2}$$

The generating matrix of Equation 2 selects 24 symbols in a first row if the first input information bit among the 7 input information bits is 1, and selects no input information bit if the first input information bit is 0. The generating matrix selects 24 symbols in a second row if the second input information bit among the 7 input information bits is 1, and selects no input information bit if the second input information bit is 0. The generating matrix selects 24 symbols in a third row if the third input information bit among the 7 input information bits is 1, and selects no input information bit if the third input information bit is 0. The generating matrix selects 24 symbols in a fourth row if the fourth input information bit among the 7 input information bits is 1, and selects no input information bit if the fourth input information bit is 0. The generating matrix selects 24 symbols in a fifth row if the fifth input information bit among the 7 input information bits is 1, and selects no input information bit if the fifth input information bit is 0. The generating matrix selects 24 symbols in a sixth row if the sixth input information bit among the 7 input information bits is 1, and selects no input information bit if the sixth input information bit is 0. The generating matrix selects 24 symbols in a seventh row if the seventh input information bit among the 7 input information bits is 1, and selects no input information bit if the seventh input information bit is 0. When all of the selected rows are subjected to XORing in a symbol unit, coded symbols corresponding to the input information bits are output.

Figure 8:
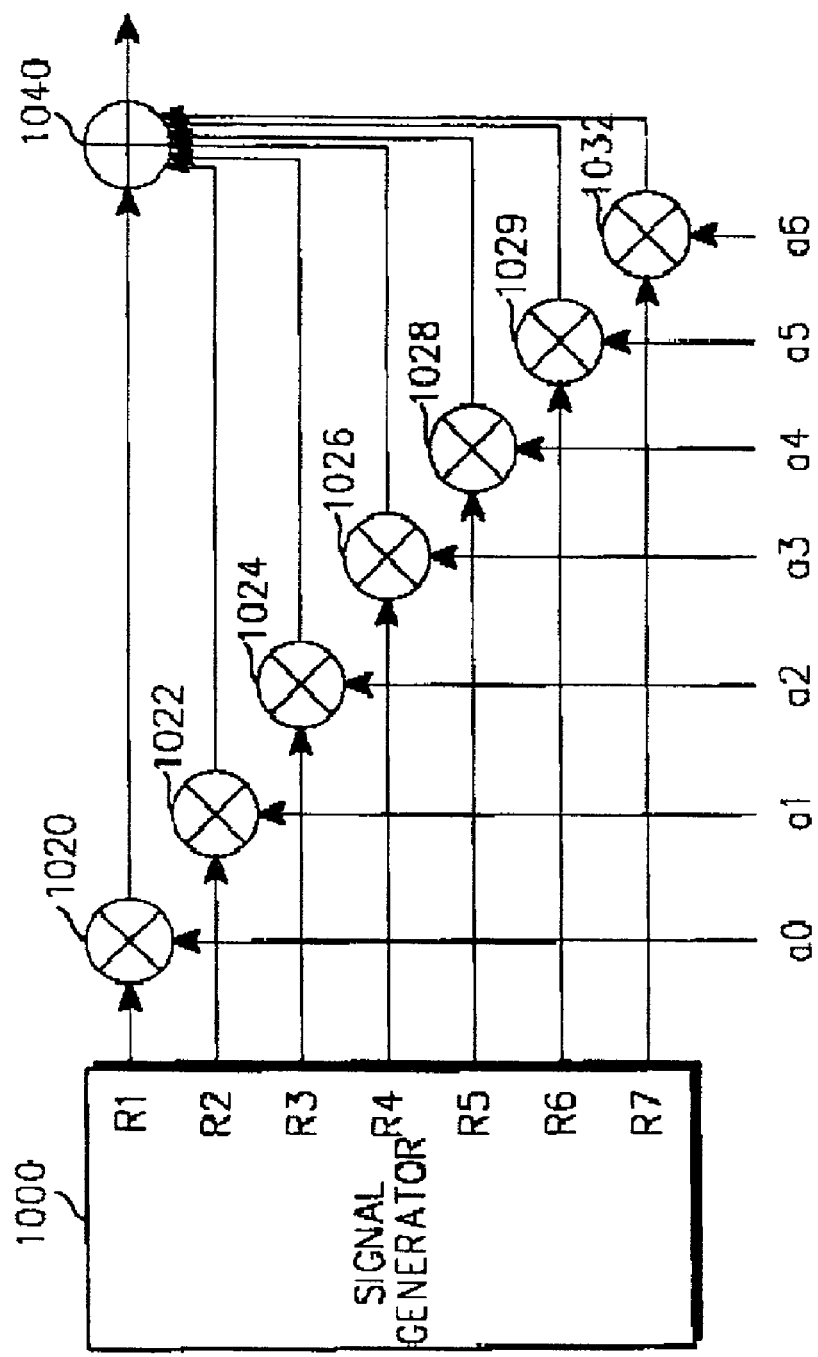
FIG. 8 illustrates a structure of a (24,7) encoder based on a generating matrix according to an embodiment of the present invention.

FIG. 8 illustrates a (24,7) encoder based on the above generating matrix. Referring to FIG. 8, of the input information bits a0-a6 having a value of 0 or 1, an input information bit a0 is applied to a multiplier 1020, an input information bit a1 is applied to a multiplier 1022, an input information bit a2 is applied to a multiplier 1024, an input information bit a3 is applied to a multiplier 1026, an input information bit a4 is applied to a multiplier 1028, an input information bit a5 is applied to a multiplier 1029, and an input information bit a6 is applied to a multiplier 1032, respectively. At the same time, a signal generator 1000 provides 7 symbol streams R1-R7 constituting the generating matrix, stored in a memory, to the multipliers 1020-1032, respectively. To be specific, the signal generator 1000 reads a length-24 symbol stream R1=1011 0110 1101 1011 0110 1101 corresponding to the first row of the generating matrix, stored in the memory, and provides the read symbol stream R1 to the multiplier 1020. The signal generator 1000 reads a length-24 symbol stream R2=0110 1101 1011 0110 1101 1011 corresponding to the second row of the generating matrix, stored in the memory, and provides the read symbol stream R2 to the multiplier 1022. The signal generator 1000 reads a length-24 symbol stream R3=0001 1100 0111 0001 1100 0111 corresponding to the third row of the generating matrix, stored in the memory, and provides the read symbol stream R3 to the multiplier 1024. The signal generator 1000 reads a length-24 symbol stream R4=0000 0011 1111 0000 0011 1111 corresponding to the fourth row of the generating matrix, stored in the memory, and provides the read symbol stream R4 to the multiplier 1026. The signal generator 1000 reads a length-24 symbol stream R5=0000 0000 0000 1111 1111 1111 corresponding to the fifth row of the generating matrix, stored in the memory, and provides the read symbol stream R5 to the multiplier 1028. The signal generator 1000 reads a length-24 symbol stream R6=1111 1101 0100 1100 0000 0000 1111 corresponding to the sixth row of the generating matrix, stored in the memory, and provides the read symbol stream R6 to the multiplier 1029. The signal generator 1000 reads a length-24 symbol stream R7=0101 1010 1100 1011 0010 0000 corresponding to the seventh row of the generating matrix, stored in the memory, and provides the read symbol stream R7 to the multiplier 1032. Then, the multiplier 1020 multiplies the symbols of the symbol stream R1 by the input information bit a0, and outputs a symbol stream of length 24 to an XOR operator 1040. The multiplier 1022 multiplies the symbols of the symbol stream R2 by the input information bit a1, and outputs a symbol stream of length 24 to the XOR operator 1040. The multiplier 1024 multiplies the symbols of the symbol stream R3 by the input information bit a2, and outputs a symbol stream of length 24 to the XOR operator 1040. The multiplier 1026 multiplies the symbols of the symbol stream R4 by the input information bit a3, and outputs a symbol stream of length 24 to the XOR operator 1040. The multiplier 1028 multiplies the symbols of the symbol stream R5 by the input information bit a4, and outputs a symbol stream of length 24 to the XOR operator 1040. The multiplier 1029 multiplies the symbols of the symbol stream R6 by the input information bit a5, and outputs a symbol stream of length 24 to the XOR operator 1040. The multiplier 1032 multiplies the symbols of the symbol stream R7 by the input information bit a6, and outputs a symbol stream of length 24 to the XOR operator 1040. The XOR operator 1040 then XORs the 7 symbol streams of length 24 in a symbol unit, and outputs a coded symbol stream of length 24.

It is possible to improve performance of and minimize complexity of the (24,7) encoder depending on the puncturing positions. The puncturing pattern {0,4,8,12,16,20,24,28} has a regular puncturing interval of 4. Such regularity of the puncturing positions contributes to a reduction of the hardware complexity. However, if the puncturing positions are concentrated on the head of a frame, it is possible to reduce the hardware complexity using a delay technique. Therefore, if the puncturing positions are focused on the foremost of the frame in consideration of the performance, the 2 mask functions will have different structures.

A structure of the extended orthogonal code having the different puncturing positions will be described with reference to FIG. 3. When M1 and M2 are the 2 mask functions stated above, 32 orthogonal codewords W of length 32 are used for the upper 32 codewords, and 32 codewords (M1+W) determined by XORing the mask function M1 and the 32 orthogonal codewords W are used for the next 32 codewords. Further, 32 codewords (M2+W) determined by XORing the mask function M2 and the 32 orthogonal codewords W are used for the next 32 codewords, and 32 codewords (M1+M2+W) determined by XORing the mask function M1 and M2 and the 32 orthogonal codewords W are used for the last 32 codewords. Therefore, a total of $2^7$=128 codewords are used as the extended orthogonal codes. The 2 mask functions for optimizing a (24,7) code can be searched through experimentation.

For example, the 2 mask functions M1 and M2 are as follows.

M1=0000 0000 1110 1000 1101 1000 1100 0000
M2=0000 0000 1100 0000 0111 1110 0010 1000

Although there are many ways to create the (24,7) linear code, it is possible not only to minimize hardware complexity but also to use an optimal codeword by utilizing a method of puncturing an extended first order Reed-Muller code according to an embodiment of the present invention. Further, it is possible to minimize the hardware complexity by minimizing a length of the orthogonal code before puncturing. In addition, it is possible not only to minimize the hardware complexity by puncturing the extended orthogonal code, but also to create an optimal code in terms of error correcting performance. It will be assumed that the embodiment of the present invention generates an error correcting code using the extended orthogonal code.

The (24,7) codeword is generated by puncturing 8 symbols from the 32 coded symbols output from a (32,7) extended code generator. Here, a change in the puncturing positions where the 8 symbols are punctured from the 32 extended coded symbols causes a change in the minimum distance $d_{min}$ of the codeword. Therefore, in order to make a (24,7) encoder with excellent error correcting performance in the (32,7) extended orthogonal code, it is important to calculate the puncturing positions where the largest minimum distance can be obtained.

The 8 puncturing positions needed for generating an optimal (24,7) linear code can be calculated through experimentation. The simplest puncturing pattern is {0,1,2,3,4,5,6,7}. In this case, a transmitter and a receiver of the mobile communication system transmitting the 7 information bits using the encoding/decoding method according to the present invention should previously agree on the 8 puncturing positions. The puncturing positions are generally defined in a communication protocol. Alternatively, the transmitter may previously provide information on the puncturing positions.

FIG. 4 illustrates a structure of an optimal (24,7) encoder included in the transmitter according to an embodiment of the present invention. Referring to FIG. 4, 7 input information bits a0, a1, a2, a3, a4, a5 and a6 are applied to a (32,7) extended orthogonal encoder 400. Here, the 7 input information bits a0, a1, a2, a3, a4, a5 and a6 constitute a rate indicator. The extended orthogonal encoder 400 encodes the 7 input information bits a0, a1, a2, a3, a4, a5 and a6, and outputs coded symbols (or a coded symbol stream) of length 32. The 32 coded symbols output from the extended orthogonal encoder 400 are provided to a puncturer 410. The puncturer 410 punctures $0^{th}$, $1^{st}$, $2^{nd}$, $3^{rd}$, $4^{th}$, $5^{th}$, $6^{th}$ and $7^{th}$ symbols in the 8 optimal puncturing positions from the 32 coded symbols and outputs 24 coded symbols.

A general code theory defines a generating matrix to show a mapping relation between the input information and the coded symbols. When the symbol puncturing is included, a generating matrix for a final (24,7) encoder is represented by $$M = \begin{bmatrix} 010101010101010101010101 \\ 001100110011001100110011 \\ 000011110000111100001111 \\ 111111110000000011111111 \\ 000000001111111111111111 \\ 111010001101100011000000 \\ 110000000111111000101000 \end{bmatrix}$$ Equation 3

The generating matrix of Equation 3 selects 24 symbols in a first row if the first input information bit among the 7 input information bits is 1, and selects no input information bit if the first input information bit is 0. The generating matrix selects 24 symbols in a second row if the second input information bit among the 7 input information bits is 1, and selects no input information bit if the second input information bit is 0. The generating matrix selects 24 symbols in a third row if the third input information bit among the 7 input information bits is 1, and selects no input information bit if the third input information bit is 0. The generating matrix selects 24 symbols in a fourth row if the fourth input information bit among the 7 input information bits is 1, and selects no input information bit if the fourth input information bit is 0. The generating matrix selects 24 symbols in a fifth row if the fifth input information bit among the 7 input information bits is 1, and selects no input information bit if the fifth input information bit is 0. The generating matrix selects 24 symbols in a sixth row if the sixth input information bit among the 7 input information bits is 1, and selects no input information bit if the sixth input information bit is 0. The generating matrix selects 24 symbols in a seventh row if the seventh input information bit among the 7 input information bits is 1, and selects no input information bit if the seventh input information bit is 0. When all of the selected rows are subjected to XORing in a symbol unit, coded symbols corresponding to the input information bits are output.

FIG. 8 illustrates a (24,7) encoder based on the above generating matrix. Referring to FIG. 8, of the input information bits a0-a6 having a value of 0 or 1, an input information bit a0 is applied to a multiplier 1020, an input information bit a1 is applied to a multiplier 1022, an input information bit a2 is applied to a multiplier 1024, an input information bit a3 is applied to a multiplier 1026, an input information bit a4 is applied to a multiplier 1028, an input information bit a5 is applied to a multiplier 1029, and an input information bit a6 is applied to a multiplier 1032, respectively. At the same time, a signal generator 1000 provides 7 symbol streams R1-R7 constituting the generating matrix, stored in a memory, to the multipliers 1020-1032, respectively. To be specific, the signal generator 1000 reads a length-24 symbol stream R1=0101 0101 0101 0101 0101 0101 corresponding to the first row of the generating matrix, stored in the memory, and provides the read symbol stream R1 to the multiplier 1020. The signal generator 1000 reads a length-24 symbol stream R2=0011 0011 0011 0011 0011 0011 corresponding to the second row of the generating matrix, stored in the memory, and provides the read symbol stream R2 to the multiplier 1022. The signal generator 1000 reads a length-24 symbol stream R3=0000 1111 0000 1111 0000 1111 corresponding to the third row of the generating matrix, stored in the memory, and provides the read symbol stream R3 to the multiplier 1024. The signal generator 1000 reads a length-24 symbol stream R4=1111 1111 0000 0000 1111 1111 corresponding to the fourth row of the generating matrix, stored in the memory, and provides the read symbol stream R4 to the multiplier 1026. The signal generator 1000 reads a length-24 symbol stream R5=0000 0000 1111 1111 1111 1111 corresponding to the fifth row of the generating matrix, stored in the memory, and provides the read symbol stream R5 to the multiplier 1028. The signal generator 1000 reads a length-24 symbol stream R6=1110 1000 1101 1000 1100 0000 corresponding to the sixth row of the generating matrix, stored in the memory, and provides the read symbol stream R6 to the multiplier 1029. The signal generator 1000 reads a length-24 symbol stream R7=1100 0000 0111 1110 0010 1000 corresponding to the seventh row of the generating matrix, stored in the memory, and provides the read symbol stream R7 to the multiplier 1032. Then, the multiplier 1020 multiplies the symbols of the symbol stream R1 by the input information bit a0, and outputs a symbol stream of length 24 to an XOR operator 1040. The multiplier 1022 multiplies the symbols of the symbol stream R2 by the input information bit a1, and outputs a symbol stream of length 24 to the XOR operator 1040. The multiplier 1024 multiplies the symbols of the symbol stream R3 by the input information bit a2, and outputs a symbol stream of length 24 to the XOR operator 1040. The multiplier 1026 multiplies the symbols of the symbol stream R4 by the input information bit a3, and outputs a symbol stream of length 24 to the XOR operator 1040. The multiplier 1028 multiplies the symbols of the symbol stream R5 by the input information bit a4, and outputs a symbol stream of length 24 to the XOR operator 1040. The multiplier 1029 multiplies the symbols of the symbol stream R6 by the input information bit a5, and outputs a symbol stream of length 24 to the XOR operator 1040. The multiplier 1032 multiplies the symbols of the symbol stream R7 by the input information bit a6, and outputs a symbol stream of length 24 to the XOR operator 1040. The XOR operator 1040 then XORs the 7 symbol streams of length 24 in a symbol unit, and outputs a coded symbol stream of length 24.

The (24,4) encoder and the (24,7) encoder have something in common in that they are both derived from the structure of the orthogonal code. That is, the (15,4) simplex code used in the (24,4) encoder is obtained by puncturing a $0^{th}$ row from an (16,4) orthogonal code, and the (32,7) extended orthogonal code used in the (24,7) encoder is extended using bases of 2 additional codewords, mask functions, in a (32,5) encoder. Therefore, based on the common point between the (24,4) encoder and the (24,7) encoder, a first embodiment described below will provide an encoder serving as both the (24,4) encoder and the (24,7) encoder with different lengths.

FIRST EMBODIMENT (ENCODER)

Figure 5:
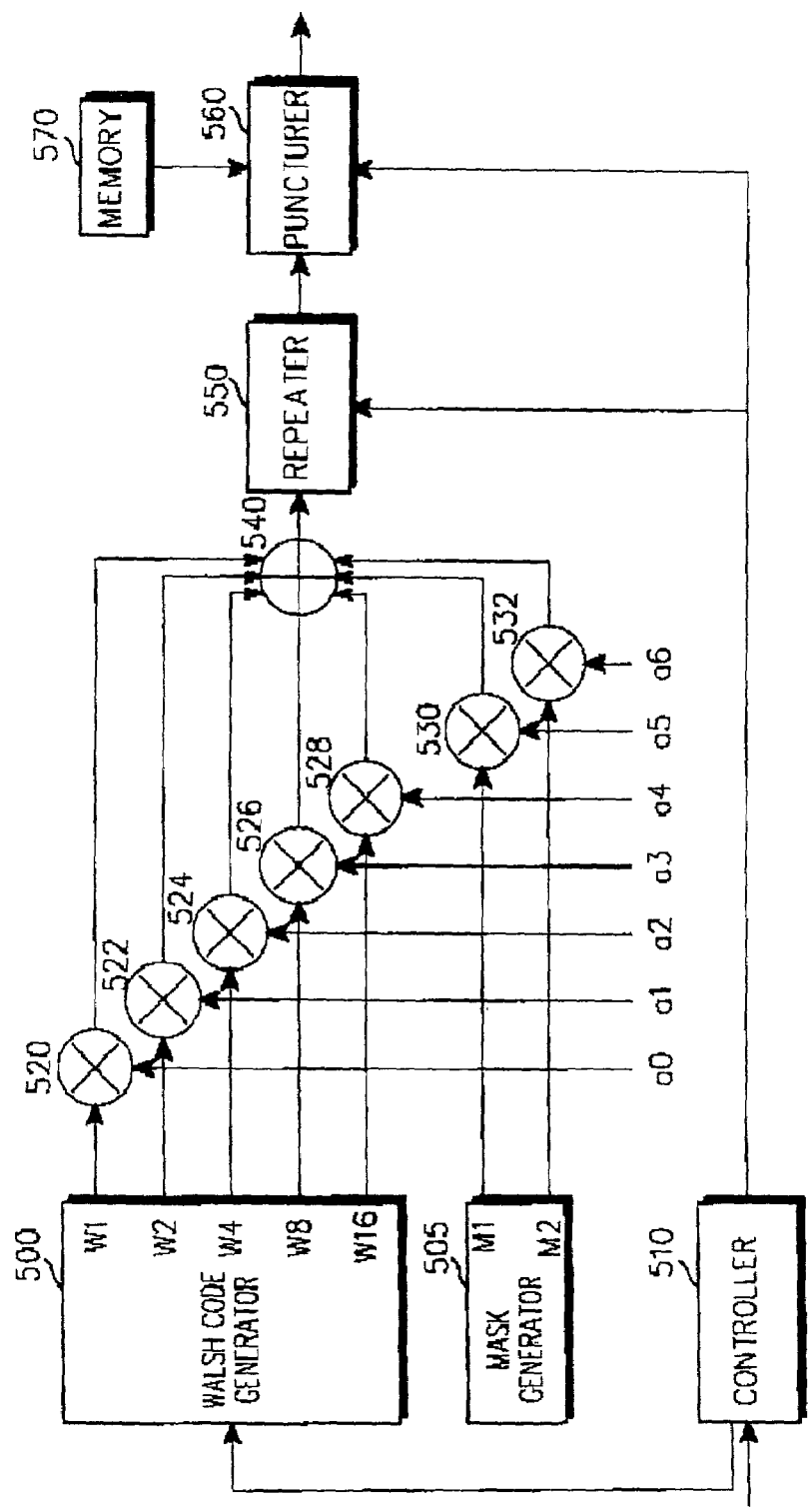
FIG. 5 illustrates a structure of an encoder serving as both the optimal (24,4) encoder and the optimal (24,7) encoder in a CDMA mobile communication system according to an embodiment of the present invention.

FIG. 5 illustrates a structure of an encoder serving as both the (24,4) encoder and the (24,7) encoder having different lengths. That is, the encoder of FIG. 5 encodes 4 or 7 input information bits with different Walsh codes or masks having a length of 16 or 32, and outputs a coded symbol stream having 24 coded symbols.

Referring to FIG. 5, a controller 510 controls an encoding operation by determining whether the number of the input information bits is 4 or 7. That is, when the number of the input information bits is 4, the controller 510 controls a Walsh code generator 500 and a mask generator 505 to generate 5 different Walsh codes and 2 different masks, all having a length of 16, respectively. Further, the controller 510 sets a repetition frequency of a repeater 550 to 1, and controls a puncturer 560 to puncture symbols in the 8 puncturing positions corresponding to the 4 input information bits.

However, when the number of the input information bits is 7, the controller 510 controls the Walsh code generator 500 and the mask generator 505 to generate 5 different Walsh codes and 2 different masks, all having a length of 32, respectively. Further, the controller 510 sets a repetition frequency of the repeater 550 to 0, and controls the puncturer 560 to puncture symbols in the 8 puncturing positions corresponding to the 7 input information bits.

The Walsh code generator 500, under the control of the controller 510, selectively generates different Walsh codes of length 16 or 32. For example, upon receiving 4 input information bits, the Walsh code generator 500 generates 5 different Walsh codes of length 16 under the control of the controller 510. However, upon receiving 7 input information bits, the Walsh code generator 500 generates 5 different Walsh codes of length 32 under the control of the controller 510. The number of the Walsh codes generated by the Walsh code generator 500 may be varied according to the number (4 or 7) of the input information bits. For example, the Walsh code generator 500 may generate 4 Walsh codes having a length of 16 upon receiving 4 input information bits, and may generate 5 Walsh codes having a length of 32 upon receiving 7 input information bits.

The mask generator 505 selectively generates masks of length 16 or 32 under the control of the controller 510. For example, upon receiving 4 input information bits, the mask generator 505 generates 2 different masks of length 16 under the control of the controller 510. However, upon receiving 7 input information bits, the mask generator 505 generates 2 different masks of length 32 under the control of the controller 510. Alternatively, the mask generator 505 may be designed to continuously generate 2 different masks, without being controlled by the controller 510. FIG. 5 illustrates the latter example in which the mask generator 505 is not controlled by the controller 510. If the mask generator 505 operates under the control of the controller 510, the mask generator 505 shall be provided with a control signal from the controller 510.

Multipliers 520-532 multiply the 4 or 7 input information bits by the Walsh codes and the masks from the Walsh code generator 500 and the mask generator 505 on a one-to-one basis, and output coded symbol streams each having 16 or 32 coded symbols. When 4 input bits are received as the input information bits, input bits having a value '0' are provided as the remaining input information bits a4, a5 and a6, so that the output values are not affected. An XOR operator 540 XORs the coded symbol streams from the multipliers 520-532, and outputs one coded symbol stream having 16 or 32 coded symbols. The repeater 550, under the control of the controller 510, repeats the coded symbol stream from the XOR operator 540 a predetermined number of times, and outputs a coded symbol stream having 32 coded symbols. That is, upon receipt of a coded symbol stream having 16 coded symbols, the repeater 550 repeats the received coded symbol stream once and outputs a coded symbol stream having 32 coded symbols. However, upon receiving a coded symbol stream having 32 coded symbols, the repeater 550 outputs the intact received coded symbol stream without repetition. A memory 570 stores 8 puncturing positions corresponding to the 4 input information bits, and 8 puncturing positions corresponding to the 7 input information bits. The 8 puncturing positions corresponding to the 4 input information bits, stored in the memory 570, are $0^{th}$, $1^{st}$, $2^{nd}$, $3^{rd}$, $4^{th}$, $5^{th}$, $6^{th}$ and $16^{th}$ symbol positions, while the 8 puncturing positions corresponding to the 7 input information bits, stored in the memory 570, are $0^{th}$, $4^{th}$, $8^{th}$, $12^{th}$, $16^{th}$, $20^{th}$, $24^{th}$ and $28^{th}$ symbol positions or $0^{th}$, $1^{st}$, $2^{nd}$, $3^{rd}$, $4^{th}$, $5^{th}$, $6^{th}$ and $7^{th}$ symbol positions.

The puncturer 560 receives the coded symbol stream having 32 coded symbols from the repeater 550, punctures coded symbols in the 8 puncturing positions read from the memory 570 from the 32 coded symbols under the control of the controller 510, and outputs a coded symbol stream having 24 coded symbols. That is, if the number of the input information bits is 4, the puncturer 560 punctures the $0^{th}$, $1^{th}$, $2^{nd}$, $3^{rd}$, $4^{th}$, $5^{th}$, $6^{th}$ and $16^{th}$ symbols from the 32 coded symbols output from the repeater 550 under the control of the controller 510, and outputs a coded symbol stream having 24 coded symbols. However, if the number of the input information bits is 7, the puncturer 560 punctures the $0^{th}$, $4^{th}$, $8^{th}$, $12^{th}$, $16^{th}$, $20^{th}$, $24^{th}$ and $28^{th}$ symbols or the $0^{th}$, $1^{st}$, $2^{nd}$, $3^{rd}$, $4^{th}$, $5^{th}$, $6^{th}$ and $7^{th}$ symbols from the 32 coded symbols output from the repeater 550 under the control of the controller 510, and outputs a coded symbol stream having 24 coded symbols.

With reference to FIG. 5, a description of the encoder will be made separately for a case where the encoder serves as a (24,4) encoder and for another case where the encoder serves as a (24,7) encoder. It will be assumed herein that the input information bits applied to the encoder constitute a rate indicator.

First, a description will be made of one case where the encoder serves as the (24,7) encoder. A 7-bit rate indicator of a0, a1, a2, a3, a4, a5 and a6 is applied to the encoder, and at the same time, bit information indicating that the 7-bit rate indicator is applied to the encoder is provided to the controller 510. The controller 510 then provides the Walsh code generator 500 with a control signal instructing it to generate Walsh codes of length 32. Upon receiving the control signal, the Walsh code generator 500 generates Walsh codes W1, W2, W4, W8 and W16 of length 32, and provides the generated Walsh codes W1, W2, W4, W8 and W16 to the associated multipliers, respectively. To be specific, the Walsh code W1 is provided to the multiplier 520, the Walsh code W2 to the multiplier 522, the Walsh code W4 to the multiplier 524, the Walsh code W8 to the multiplier 526, and the Walsh code W16 to the multiplier 528. Shown in Table 1 are the Walsh codes of length 32 generated by the Walsh code generator 500.

TABLE 1

| Walsh Number | Walsh Code |
|---|---|
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 505 generates a mask M1=0111 0111 0010 0100 0110 0000 0000 0000 and a mask M2=0010 0110 0101 0100 0101 0100 0100 0000, and provides the generated masks M1 and M2 to the multipliers 530 and 532, respectively.

Meanwhile, the 7 input information bits of the rate indicator are provided to the associated multipliers, respectively. Shown in Table 2 are the relations between the 7 input information bits and the associated multipliers.

TABLE 2

| Input Information Bit | Multiplier |
| --- | --- |
| a0 | Multiplier 520 |
| a1 | Multiplier 522 |
| a2 | Multiplier 524 |
| a3 | Multiplier 526 |
| a4 | Multiplier 528 |
| a5 | Multiplier 530 |
| a6 | Multiplier 532 |

Therefore, shown in Table 3 are the input information bits and the Walsh codes or masks provided to the respective multipliers.

TABLE 3

| Multiplier | Walsh Code/Mask | Input Information Bit |
| --- | --- | --- |
| Multiplier 520 | W1 = 0101 0101 0101 0101 0101 0101 0101 0101 | a0 |
| Multiplier 522 | W2 = 0011 0011 0011 0011 0011 0011 0011 0011 | a1 |
| Multiplier 524 | W4 = 0000 1111 0000 1111 0000 1111 0000 1111 | a2 |
| Multiplier 526 | W8 = 0000 0000 1111 1111 0000 0000 1111 1111 | a3 |
| Multiplier 528 | W16 = 0000 0000 0000 0000 1111 1111 1111 1111 | a4 |
| Multiplier 530 | M1 = 0111 0111 0010 0100 0110 0000 0000 0000 | a5 |
| Multiplier 532 | M2 = 0010 0110 0101 0100 0101 0100 0100 0000 | a6 |

The multipliers multiply the input information bits by the Walsh codes or masks, provided thereto as shown in Table 3, and provide their outputs to the XOR operator 540.

Specifically, the multiplier 520 multiplies the input information bit a0 by the Walsh code W1 every symbol (i.e., in a symbol unit), and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540. The multiplier 526 multiplies the input information bit a3 by the Walsh code W8 every symbol, and provides its output to the XOR operator 540. The multiplier 528 multiplies the input information bit a4 by the Walsh code W16 every symbol, and provides its output to the XOR operator 540. The multiplier 530 multiplies the input information bit a5 by the mask M1 every symbol, and provides its output to the XOR operator 540. The multiplier 532 multiplies the input information bit a6 by the mask M2 every symbol, and provides its output to the XOR operator 540.

The XOR operator 540 then XORs the symbol streams of length 32 output from the multipliers 520, 522, 524, 526, 528, 530 and 532 in a symbol unit, and provides its output to the repeater 550.

The coded symbol stream Ws of length 32, output from the XOR operator 540, can be defined as $$Ws=(W1 \times a0)+(W2 \times a1)+(W4 \times a2)+(W8 \times a3)+(W16 \times a4)+(M1 \times a5)+(M2 \times a6) \qquad \text{Equation 4}$$

At this moment, the controller 510 provides the repeater 550 with a control signal for controlling a repetition frequency over the output of the XOR operator 540. In the (24,7) encoder, as the symbol stream output from the XOR operator 540 has a length of 32, the repeater 550 does not perform repetition. To this end, the controller 510 provides the repeater 550 with a control signal instructing it to output the intact input signal. In response to the control signal, the repeater 550 provides the puncturer 560 with the intact symbol stream of length 32 output from the XOR operator 540.

At this point, the controller 510 provides the puncturer 560 with a control signal instructing it to puncture symbols in the puncturing positions for the (24,7) code. The controller 510 may provide the puncturer 560 with length information (7 bits) of the rate indicator as the control signal. The puncturer 560 then receives 8 puncturing positions corresponding to the 7 input information bits of the rate indicator from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $4^{th}$, $8^{th}$, $12^{th}$, $16^{th}$, $20^{th}$, $24^{th}$ and $28^{th}$ symbol positions, the puncturer 560 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Until now, an operation of the (24,7) encoder has been described with reference to one case where the encoder has the puncturing pattern {0,4,8,12,16,20,24,28}. Now, an operation of the (24,7) will be described with reference to another case where the encoder has the puncturing pattern {0,1,2,3,4,5,6,7} in order to reduce the hardware complexity as stated above. In this case, when a 7-bit rate indicator of a0, a1, a2, a3, a4, a5 and a6 is applied to the encoder, bit information indicating that the 7-bit rate indicator is applied to the encoder is provided to the controller 510. The controller 510 then provides the Walsh code generator 500 with a control signal instructing it to generate Walsh codes of length 32. Upon receiving the control signal, the Walsh code generator 500 generates Walsh codes W1, W2, W4, W8 and W16 of length 32, and provides the generated Walsh codes W1, W2, W4, W8 and W16 to the associated multipliers, respectively. To be specific, the Walsh code W1 is provided to the multiplier 520, the Walsh code W2 to the multiplier 522, the Walsh code W4 to the multiplier 524, the Walsh code W8 to the multiplier 526, and the Walsh code W16 to the multiplier 528. Shown in Table 4 are the Walsh codes of length 32 generated by the Walsh code generator 500.

TABLE 4

| Walsh Number | Walsh Code |
| --- | --- |
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 505 generates a mask M1=0000 0000 1110 1000 1101 1000 1100 0000 and a mask M2=0000 0000 1100 0000 0111 1110 0010 1000, and provides the generated masks M1 and M2 to the multipliers 530 and 532, respectively.

Meanwhile, the 7 input information bits of the rate indicator are provided to the associated multipliers, respectively. Shown in Table 5 are the relations between the 7 input information bits and the associated multipliers.

TABLE 5

| Input Information Bit | Multiplier |
| --- | --- |
| a0 | Multiplier 520 |
| a1 | Multiplier 522 |
| a2 | Multiplier 524 |
| a3 | Multiplier 526 |
| a4 | Multiplier 528 |
| a5 | Multiplier 530 |
| a6 | Multiplier 532 |

Therefore, shown in Table 6 are the input information bits and the Walsh codes or masks provided to the respective multipliers.

TABLE 6

| Multiplier | Walsh Code/Mask | Input Information Bit |
| --- | --- | --- |
| Multiplier 520 | W1 = 0101 0101 0101 0101 0101 0101 0101 0101 | a0 |
| Multiplier 522 | W2 = 0011 0011 0011 0011 0011 0011 0011 0011 | a1 |
| Multiplier 524 | W4 = 0000 1111 0000 1111 0000 1111 0000 1111 | a2 |
| Multiplier 526 | W8 = 0000 0000 1111 1111 0000 0000 1111 1111 | a3 |
| Multiplier 528 | W16 = 0000 0000 0000 0000 1111 1111 1111 1111 | a4 |
| Multiplier 530 | M1 = 0000 0000 1110 1000 1101 1000 1100 0000 | a5 |
| Multiplier 532 | M2 = 0000 0000 1100 0000 0111 1110 0010 1000 | a6 |

The multipliers multiply the input information bits by the Walsh codes or masks, provided thereto as shown in Table 6, and provide their outputs to the XOR operator 540.

Specifically, the multiplier 520 multiplies the input information bit a0 by the Walsh code W1 every symbol, and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540. The multiplier 526 multiplies the input information bit a3 by the Walsh code W8 every symbol, and provides its output to the XOR operator 540. The multiplier 528 multiplies the input information bit a4 by the Walsh code W16 every symbol, and provides its output to the XOR operator 540. The multiplier 530 multiplies the input information bit a5 by the mask M1 every symbol, and provides its output to the XOR operator 540. The multiplier 532 multiplies the input information bit a6 by the mask M2 every symbol, and provides its output to the XOR operator 540.

The XOR operator 540 then XORs the symbol streams of length 32 output from the multipliers 520, 522, 524, 526, 528, 530 and 532 in a symbol unit, and provides its output to the repeater 550.

The coded symbol stream Ws of length 32, output from the XOR operator 540, is then defined as $$Ws=(W1 \times a0)+(W2 \times a1)+(W4 \times a2)+(W8 \times a3)+(W16 \times a4)+(M1 \times a5)+(M2 \times a6) \qquad \text{Equation 5}$$

At this moment, the controller 510 provides the repeater 550 with a control signal for controlling a repetition frequency over the output of the XOR operator 540. In the (24,7) encoder, as the symbol stream output from the XOR operator 540 has a length of 32, a repetition frequency of the repeater 550 is '0'. Therefore, the controller 510 provides the repeater 550 with a control signal instructing it to output the intact input signal. In response to the control signal, the repeater 550 provides the puncturer 560 with the intact symbol stream of length 32 output from the XOR operator 540.

At this point, the controller 510 provides the puncturer 560 with a control signal instructing it to puncture symbols in the puncturing positions for the (24,7) code. The puncturer 560 then receives 8 puncturing positions from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $1^{st}$, $2^{nd}$, $3^{rd}$, $4^{th}$, $5^{th}$, $6^{th}$ and $7^{th}$ symbol positions, the puncturer 560 punctures $0^{th}$, $1^{st}$, $2^{nd}$, $3^{rd}$, $4^{th}$, $5^{th}$, $6^{th}$ and $7^{th}$ coded symbols from the coded symbols of length 32, and outputs 24 coded symbols.

Second, a description will be made of another case where the encoder serves as the (24,4) encoder. A 4-bit rate indicator of a0, a1, a2 and a3 is applied to the encoder, and the remaining input information bits a4, a5 and a6 are initialized to '0'. At the same time, bit information indicating that the 4-bit rate indicator is applied to the encoder is provided to the controller 510. The controller 510 then provides the Walsh code generator 500 with a control signal instructing it to generate Walsh codes of length 16. Upon receiving the control signal, the Walsh code generator 500 generates Walsh codes W1, W2, W4 and W8 of length 16, and provides the generated Walsh codes W1, W2, W4 and W8 to the associated multipliers, respectively. To be specific, the Walsh code W1 is provided to the multiplier 520, the Walsh code W2 to the multiplier 522, the Walsh code W4 to the multiplier 524, and the Walsh code W8 to the multiplier 526. Shown in Table 7 are the Walsh codes of length 16 generated by the Walsh code generator 500.

TABLE 7

| Walsh Number | Walsh Code |
| --- | --- |
| W1 | 0101 0101 0101 0101 |
| W2 | 0011 0011 0011 0011 |
| W4 | 0000 1111 0000 1111 |
| W8 | 0000 0000 1111 1111 |

Meanwhile, the 4 input information bits of the rate indicator are provided to the associated multipliers, respectively. Shown in Table 8 are the relations between the 4 input information bits and the associated multipliers.

TABLE 8

| Input Information Bit | Multiplier |
| --- | --- |
| a0 | Multiplier 520 |
| a1 | Multiplier 522 |
| a2 | Multiplier 524 |
| a3 | Multiplier 526 |

Therefore, shown in Table 9 are the input information bits and the Walsh codes provided to the respective multipliers.

TABLE 9

| Multiplier | Walsh Code | Input Information Bit |
| --- | --- | --- |
| Multiplier 520 | W1 = 0101 0101 0101 0101 | a0 |
| Multiplier 522 | W2 = 0011 0011 0011 0011 | a1 |
| Multiplier 524 | W4 = 0000 1111 0000 1111 | a2 |
| Multiplier 526 | W8 = 0000 0000 1111 1111 | a3 |

The multipliers multiply the input information bits by the Walsh codes, provided thereto as shown in Table 9, and provide their outputs to the XOR operator 540. Specifically, the multiplier 520 multiplies the input information bit a0 by the Walsh code W1 every symbol, and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540. The multiplier 526 multiplies the input information bit a3 by the Walsh code W8 every symbol, and provides its output to the XOR operator 540.

Meanwhile, since the multipliers 528, 530 and 532 receive the input information bits a4, a5 and a6 initialized to '0', the outputs of the multipliers 528, 530 and 532 do not affect the output of the XOR operator 540 regardless of the Walsh code W16 from the Walsh code generator 500 and the masks M1 and M2 from the mask generator 505. To be specific, the multiplier 528 outputs a symbol stream having coded symbols all having a value '0' regardless of a value of the Walsh code W16 from the Walsh code generator 500. Similarly, the multipliers 530 and 532 output symbol streams each having coded symbols all having a value '0' regardless of values of the masks M1 and M2 from the mask generator 505. As a result, the outputs of the multipliers 528, 530 and 532 do not affect the output of the XOR operator 540, though they are provided to the XOR operator 540. Initializing the input information bits a4, a5 and a6 to '0' is equivalent to a switching operation for cutting off the outputs of the multipliers 528, 530 and 532.

The XOR operator 540 then XORs the symbol streams of length 16 output from the multipliers 520, 522, 524, 526, 528, 530 and 532 in a symbol unit, and provides its output to the repeater 550.

The coded symbol stream Ws of length 16, output from the XOR operator 540, is then defined as $$Ws = (W1 \times a0) + (W2 \times a1) + (W4 \times a2) + (W8 \times a3)$$ Equation 6

At this moment, the controller 510 provides the repeater 550 with a control signal for controlling a repetition frequency over the output of the XOR operator 540. In the (24,4) encoder, as the symbol stream output from the XOR operator 540 has a length of 16, a repetition frequency of the repeater 550 shall be '1'. Therefore, the controller 510 provides the repeater 550 with a control signal instructing it to repeat the input signal once. In response to the control signal, the repeater 550 repeats the symbol stream of length 16 output from the XOR operator 540 one time, and provides the puncturer 560 with a symbol stream of length 32.

At this point, the controller 510 provides the puncturer 560 with a control signal instructing it to puncture symbols in the puncturing positions for the (24,4) code. The puncturer 560 then receives 8 puncturing positions read from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $2^{nd}$, $3^{rd}$, $4^{th}$, $5^{th}$, $6^{th}$ and $16^{th}$ symbol positions, the puncturer 560 punctures $0^{th}$, $1^{st}$, $2^{nd}$, $3^{rd}$, $4^{th}$, $5^{th}$, $6^{th}$ and $16^{th}$ coded symbols from the coded symbols of length 32, and outputs 24 coded symbols.

SECOND EMBODIMENT (ENCODER)

Figure 9:
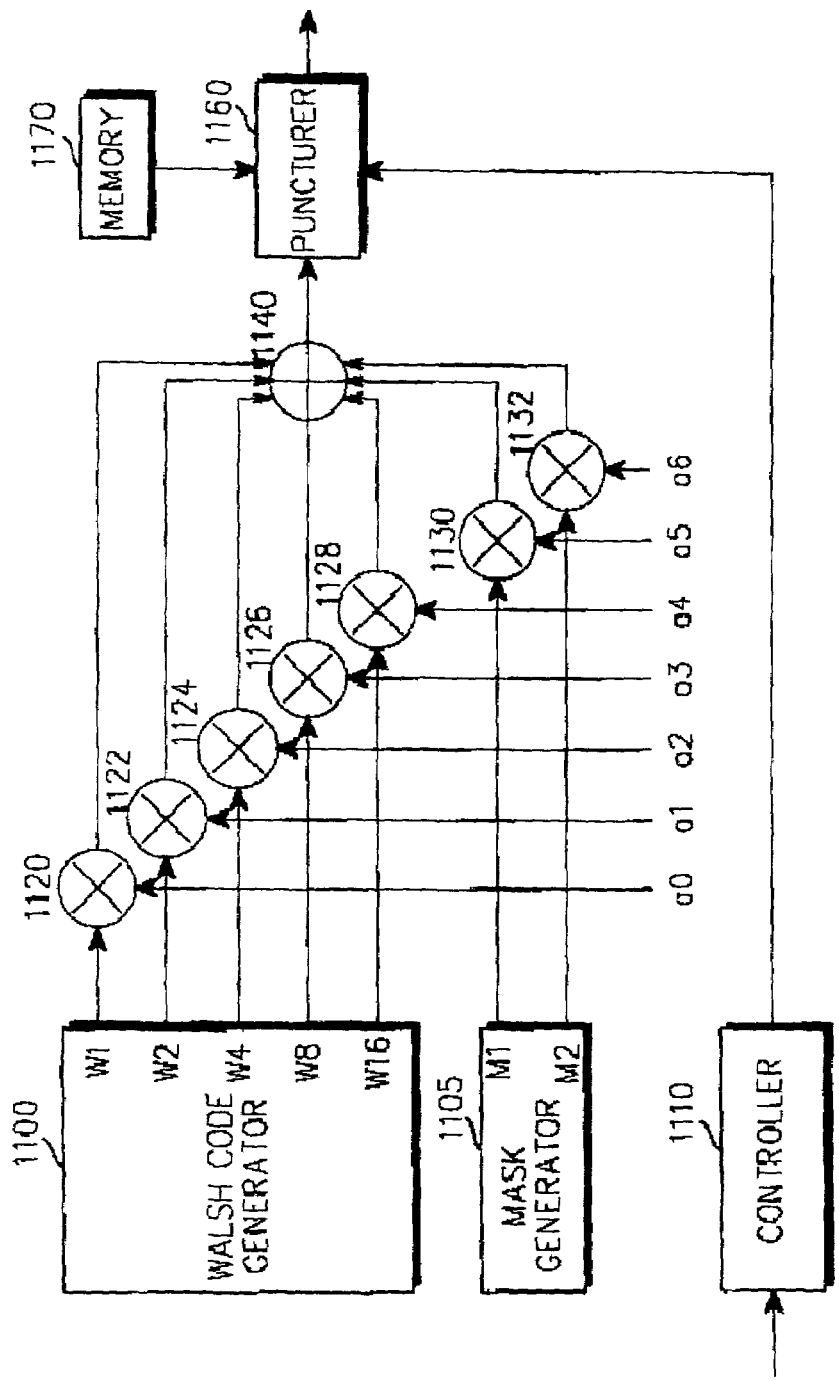
FIG. 9 illustrates a modified structure of an encoder serving as both the (24,4) encoder and the (24,7) encoder in a CDMA mobile communication system according to an embodiment of the present invention.

FIG. 9 illustrates another structure of an encoder serving as both the (24,4) encoder and the (24,7) encoder having different lengths. That is, the encoder of FIG. 9 encodes 4 or 7 input information bits with different Walsh codes or masks having a length of 32, and outputs a coded symbol stream having 24 coded symbols. Unlike the encoder according to the first embodiment, the encoder according to the second embodiment does not include the symbol repeater.

Referring to FIG. 9, a controller 1110 controls an encoding operation by determining whether the number of the input information bits is 4 or 7. That is, the controller 1110 provides a puncturer 1160 with a control signal instructing it to puncture symbols in 8 puncturing positions corresponding to the input information bits. A Walsh code generator 1100 generates Walsh codes of length 32. For example, upon receiving the input information bits, the Walsh code generator 1100 generates 5 different Walsh codes of length 32. A mask generator 1105 generates masks of length 32. For example, upon receiving the input information bits, the mask generator 1105 generates 2 different masks of length 32.

Multipliers 1120-1132 multiply the 4 or 7 input information bits by the Walsh codes and the masks from the Walsh code generator 1100 and the mask generator 1105 on a one-to-one basis, and output coded symbol streams each having 32 coded symbols. An XOR operator 1140 XORs the coded symbol streams from the multipliers 1120-1132, and outputs one coded symbol stream having 32 coded symbols. A memory 1170 stores 8 puncturing positions corresponding to the 4 input information bits, and 8 puncturing positions corresponding to the 7 input information bits. The 8 puncturing positions corresponding to the 4 input information bits, stored in the memory 1170, are $0^{th}$, $1^{st}$, $2^{nd}$, $3^{rd}$, $4^{th}$, $5^{th}$, $6^{th}$ and $16^{th}$ symbol positions, while the 8 puncturing positions corresponding to the 7 input information bits, stored in the memory 1170, are $0^{th}$, $4^{th}$, $8^{th}$, $12^{th}$, $16^{th}$, $20^{th}$, $24^{th}$ and $28^{th}$ symbol positions or $0^{th}$, $1^{st}$, $2^{nd}$, $3^{rd}$, $4^{th}$, $5^{th}$, $6^{th\ and}\ 7^{th}$ symbol positions.

The puncturer 1160 receives the coded symbol stream having 32 coded symbols from the XOR operator 1140, punctures coded symbols in the 8 puncturing positions read from the memory 1170 from the 32 coded symbols under the control of the controller 1110, and outputs a coded symbol stream having 24 coded symbols. That is, if the number of the input information bits is 4, the puncturer 1160 punctures the $0^{th}$, $1^{st}$, $2^{nd}$, $3^{rd}$, $4^{th}$, $5^{th}$, $6^{th}$ and $16^{th}$ symbols from the 32 coded symbols output from the XOR operator 1140 under the control of the controller 1110, and outputs a coded symbol stream having 24 coded symbols. However, if the number of the input information bits is 7, the puncturer 1160 punctures the $0^{th}$, $4^{th}$, $8^{th}$, $12^{th}$, $16^{th}$, $20^{th}$, $24^{th}$ and $28^{th}$ symbols or the $0^{th}$, $1^{st}$, $2^{nd}$, $3^{rd}$, $4^{th}$, $5^{th}$, $6^{th}$ and $7^{th}$ symbols from the 32 coded symbols output from the XOR operator 1140 under the control of the controller 1110, and outputs a coded symbol stream having 24 coded symbols.

With reference to FIG. 9, a description of the encoder will be made separately for one case where the encoder serves as a (24,4) encoder and another case where the encoder serves as a (24,7) encoder. It will be assumed herein that the input information bits applied to the encoder constitute a rate indicator.

First, a description will be made of one case where the encoder serves as the (24,7) encoder. When a 7-bit rate indicator of a0, a1, a2, a3, a4, a5 and a6 is applied to the encoder, bit information indicating that the 7-bit rate indicator is applied to the encoder is provided to the controller 1110. The Walsh code generator 1100 then generates Walsh codes W1, W2, W4, W8 and W16 of length 32. The Walsh code generator 1100 may operate either under the control of the controller 1110 or without separate control. FIG. 9 illustrates an example where the Walsh code generator 1100 operates without separate control. The Walsh codes W1, W2, W4, W8 and W16 generated by the Walsh code generator 1100 are provided to the associated multipliers, respectively. To be specific, the Walsh code W1 is provided to the multiplier 1120, the Walsh code W2 to the multiplier 1122, the Walsh code W4 to the multiplier 1124, the Walsh code W8 to the multiplier 1126, and the Walsh code W16 to the multiplier 1128. Shown in Table 10 are the Walsh codes of length 32 generated by the Walsh code generator 1100.

TABLE 10

| Walsh Number | Walsh Code |
| --- | --- |
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 1105 generates a mask M1=0111 0111 0010 0100 0110 0000 0000 0000 and a mask M2=0010 0110 0101 0100 0101 0100 0100 0000, and provides the generated masks M1 and M2 to the multipliers 1130 and 1132, respectively.

Meanwhile, the 7 input information bits of the rate indicator are provided to the associated multipliers, respectively. Shown in Table 11 are the relations between the 7 input information bits and the associated multipliers.

TABLE 11

| Input Information Bit | Multiplier |
| --- | --- |
| a0 | Multiplier 1120 |
| a1 | Multiplier 1122 |
| a2 | Multiplier 1124 |
| a3 | Multiplier 1126 |
| a4 | Multiplier 1128 |
| a5 | Multiplier 1130 |
| a6 | Multiplier 1132 |

Therefore, shown in Table 12 are the input information bits and the Walsh codes or masks provided to the respective multipliers.

TABLE 12

| Multiplier | Walsh Code/Mask | Input Information Bit |
| --- | --- | --- |
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |
| Multiplier 1126 | W8 = 0000 0000 1111 1111 0000 0000 1111 1111 | a3 |
| Multiplier 1128 | W16 = 0000 0000 0000 0000 1111 1111 1111 1111 | a4 |
| Multiplier 1130 | M1 = 0111 0111 0010 0100 0110 0000 0000 0000 | a5 |
| Multiplier 1132 | M2 = 0010 0110 0101 0100 0101 0100 0100 0000 | a6 |

The multipliers multiply the input information bits by the Walsh codes or masks, provided thereto as shown in Table 12, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140. The multiplier 1124 multiplies the input information bit a2 by the Walsh code W4 every symbol, and provides its output to the XOR operator 1140. The multiplier 1126 multiplies the input information bit a3 by the Walsh code W8 every symbol, and provides its output to the XOR operator 1140. The multiplier 1128 multiplies the input information bit a4 by the Walsh code W16 every symbol, and provides its output to the XOR operator 1140. The multiplier 1130 multiplies the input information bit a5 by the mask M1 every symbol, and provides its output to the XOR operator 1140. The multiplier 1132 multiplies the input information bit a6 by the mask M2 every symbol, and provides its output to the XOR operator 1140.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws = (W1 \times a0) + (W2 \times a1) + (W4 \times a2) + (W8 \times a3) + (W16 \times a4) + (M1 \times a5) + (M2 \times a6) \qquad \text{Equation 7}$$

At this moment, the controller 1110 provides the puncturer 1160 with a control signal instructing it to puncture symbols in the puncturing positions for the (24,7) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $4^{th}$, $8^{th}$, $12^{th}$, $16^{th}$, $20^{th}$, $24^{th}$ and $28^{th}$ symbol positions, the puncturer 1160 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Above, an operation of the (24,7) encoder has been described with reference to one case where the encoder has the puncturing pattern {0,4,8,12,16,20,24,28}. Now, an operation of the (24,7) will be described with reference to another case where the encoder has the puncturing pattern {0,1,2,3,4,5,6,7} in order to reduce the hardware complexity as stated above. In this case, when a 7-bit rate indicator of a0, a1, a2, a3, a4, a5 and a6 is applied to the encoder, bit information indicating that the 7-bit rate indicator is applied to the encoder is provided to the controller 1110. The Walsh code generator 1100 then generates Walsh codes W1, W2, W4, W8 and W16 of length 32. The Walsh codes W1, W2, W4, W8 and W16 generated by the Walsh code generator 1100 are provided to the associated multipliers, respectively. To be specific, the Walsh code W1 is provided to the multiplier 1120, the Walsh code W2 to the multiplier 1122, the Walsh code W4 to the multiplier 1124, the Walsh code W8 to the multiplier 1126, and the Walsh code W16 to the multiplier 1128. Shown in Table 13 are the Walsh codes of length 32 generated by the Walsh code generator 1100.

TABLE 13

| Walsh Number | Walsh Code |
| --- | --- |
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 1105 generates a mask M1=0000 0000 1110 1000 1101 1000 1100 0000 and a mask M2=0000 0000 1100 0000 0111 1110 0010 1000, and provides the generated masks M1 and M2 to the multipliers 1130 and 1132, respectively.

Meanwhile, the 7 input information bits of the rate indicator are provided to the associated multipliers, respectively. Shown in Table 14 are the relations between the 7 input information bits and the associated multipliers.

TABLE 14

| Input Information Bit | Multiplier |
| --- | --- |
| a0 | Multiplier 1120 |
| a1 | Multiplier 1122 |
| a2 | Multiplier 1124 |
| a3 | Multiplier 1126 |
| a4 | Multiplier 1128 |
| a5 | Multiplier 1130 |
| a6 | Multiplier 1132 |

Therefore, shown in Table 15 are the input information bits and the Walsh codes or masks provided to the respective multipliers.

TABLE 15

| Multiplier | Walsh Code/Mask | Input Information Bit |
| --- | --- | --- |
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |
| Multiplier 1126 | W8 = 0000 0000 1111 1111 0000 0000 1111 1111 | a3 |
| Multiplier 1128 | W16 = 0000 0000 0000 0000 1111 1111 1111 1111 | a4 |
| Multiplier 1130 | M1 = 0000 0000 1110 1000 1101 1000 1100 0000 | a5 |
| Multiplier 1132 | M2 = 0000 0000 1100 0000 0111 1110 0010 1000 | a6 |

The multipliers multiply the input information bits by the Walsh codes or masks, provided thereto as shown in Table 15, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140. The multiplier 1124 multiplies the input information bit a2 by the Walsh code W4 every symbol, and provides its output to the XOR operator 1140. The multiplier 1126 multiplies the input information bit a3 by the Walsh code W8 every symbol, and provides its output to the XOR operator 1140. The multiplier 1128 multiplies the input information bit a4 by the Walsh code W16 every symbol, and provides its output to the XOR operator 1140. The multiplier 1130 multiplies the input information bit a5 by the mask M1 every symbol, and provides its output to the XOR operator 1140. The multiplier 1132 multiplies the input information bit a6 by the mask M2 every symbol, and provides its output to the XOR operator 1140.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws = (W1 \times a0) + (W2 \times a1) + (W4 \times a2) + (W8 \times a3) + (W16 \times a4) + (M1 \times a5) + (M2 \times a6) \qquad \text{Equation 8}$$

At this moment, the controller 1110 provides the puncturer 1160 with a control signal instructing it to puncture symbols in the puncturing positions for the (24,7) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $1^{st}$, $2^{nd}$, $3^{rd}$, $4^{th}$, $5^{th}$, $6^{th}$ and $7^{th}$ symbol positions, the puncturer 1160 punctures $0^{th}$, $1^{st}$, $2^{nd}$, $3^{rd}$, $4^{th}$, $5^{th}$, $6^{th}$ and $7^{th}$ coded symbols from the coded symbols of length 32, and outputs 24 coded symbols.

Second, a description will be made of another case where the encoder serves as the (24,4) encoder. A 4-bit rate indicator of a0, a1, a2 and a3 is applied to the encoder, and the remaining input information bits a4, a5 and a6 are initialized to '0'. The Walsh code generator 1100 then generates Walsh codes W1, W2, W4 and W8 of length 16, and provides the generated Walsh codes W1, W2, W4 and W8 to the associated multipliers, respectively. To be specific, the Walsh code W1 is provided to the multiplier 1120, the Walsh code W2 to the multiplier 1122, the Walsh code W4 to the multiplier 1124, and the Walsh code W8 to the multiplier 1126. Shown in Table 16 are the Walsh codes of length 32 generated by the Walsh code generator 1100.

TABLE 16

| Walsh Number | Walsh Code |
|---|---|
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |

Meanwhile, the 4 input information bits of the rate indicator are provided to the associated multipliers, respectively. Shown in Table 17 are the relations between the 4 input information bits and the associated multipliers.

TABLE 17

| Input Information Bit | Multiplier |
|---|---|
| a0 | Multiplier 1120 |
| a1 | Multiplier 1122 |
| a2 | Multiplier 1124 |
| a3 | Multiplier 1126 |

Therefore, shown in Table 18 are the input information bits and the Walsh codes or masks provided to the respective multipliers.

TABLE 18

| Multiplier | Walsh Code/Mask | Input Information Bit |
|---|---|---|
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |
| Multiplier 1126 | W8 = 0000 0000 1111 1111 0000 0000 1111 1111 | a3 |

The multipliers multiply the input information bits by the Walsh codes, provided thereto as shown in Table 18, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140. The multiplier 1124 multiplies the input information bit a2 by the Walsh code W4 every symbol, and provides its output to the XOR operator 1140. The multiplier 1126 multiplies the input information bit a3 by the Walsh code W8 every symbol, and provides its output to the XOR operator 1140.

Meanwhile, since the multipliers 1128, 1130 and 1132 receive the input information bits a4, a5 and a6 initialized to '0', the outputs of the multipliers 1128, 1130 and 1132 do not affect the output of the XOR operator 1140 regardless of the Walsh code W16 from the Walsh code generator 1100 and the masks M1 and M2 from the mask generator 1105. To be specific, the multiplier 1128 outputs a symbol stream having coded symbols all having a value '0' regardless of a value of the Walsh code W16 from the Walsh code generator 1100. Similarly, the multipliers 1130 and 1132 output symbol streams each having coded symbols all having a value '0' regardless of values of the masks M1 and M2 from the mask generator 1105. As a result, the outputs of the multipliers 1128, 1130 and 1132 do not affect the output of the XOR operator 1140, though they are provided to the XOR operator 1140. Initializing the input information bits a4, a5 and a6 to '0' is equivalent to a switching operation for cutting off the outputs of the multipliers 1128, 1130 and 1132.

The XOR operator 1140 then XORs the symbol streams of length 16 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws=(W1 \times a0)+(W2 \times a1)+(W4 \times a2)+(W8 \times a3) \qquad \text{Equation 9}$$

At this point, the controller 1110 provides the puncturer 1160 with a control signal instructing it to puncture symbols in the puncturing positions for the (24,4) code. The puncturer 1160 then receives 8 puncturing positions read from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $1^{st}$, $2^{nd}$, $3^{rd}$, $4^{th}$, $5^{th}$, $6^{th}$ and $16^{th}$ symbol positions, the puncturer 1160 punctures $0^{th}$, $1^{st}$, $2^{nd}$, $3^{rd}$, $4^{th}$, $5^{th}$, $6^{th}$ and $16^{th}$ coded symbols from the coded symbols of length 32, and outputs 24 coded symbols.

EMBODIMENT (DECODER)

Figure 6:
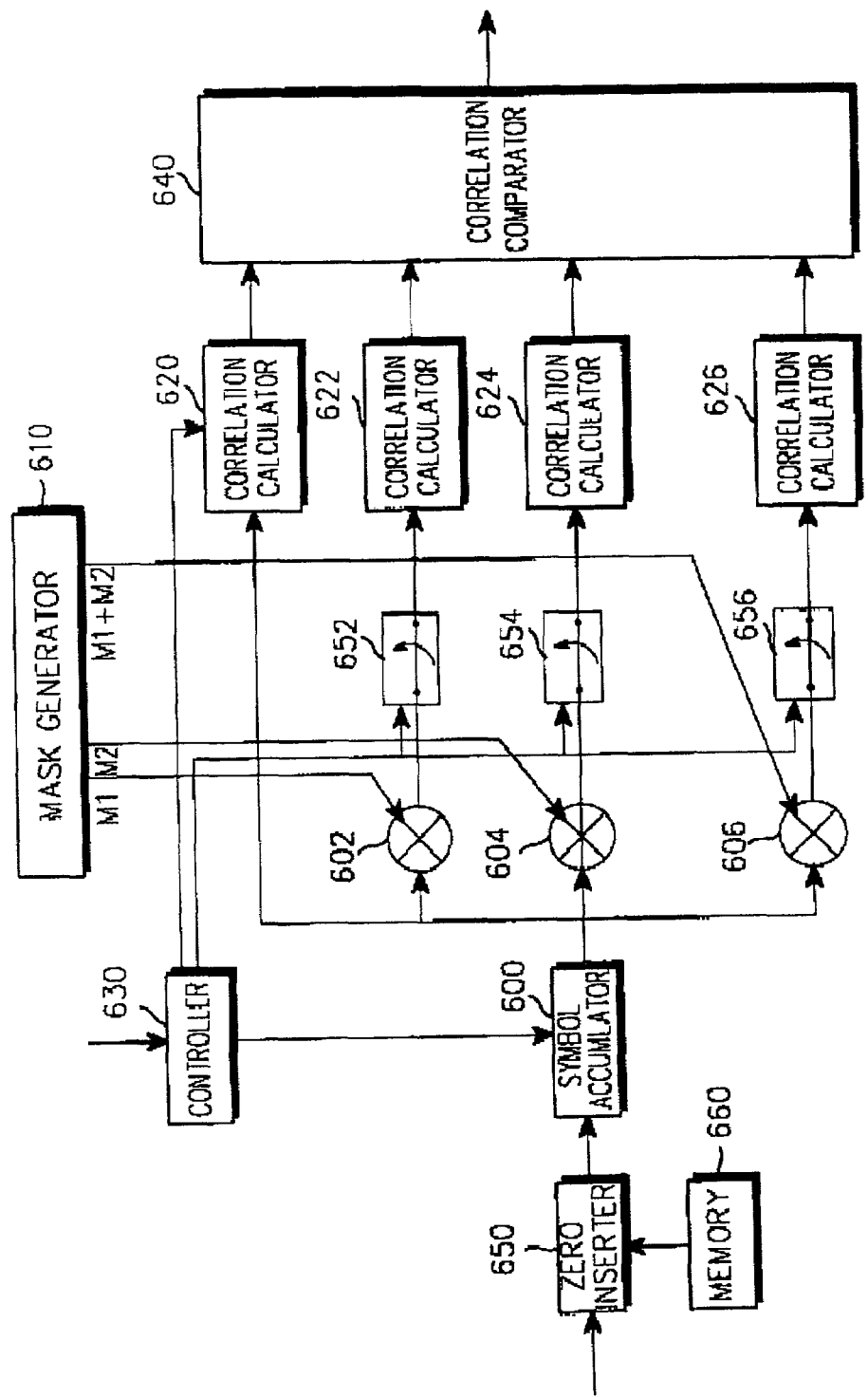
FIG. 6 illustrates a structure of a decoder in a CDMA mobile communication system according to an embodiment of the present invention.

FIG. 6 illustrates a structure of a decoder corresponding to the encoder of FIG. 5. A description of the decoder will be made separately for a case where the encoder serves as a (24,4) decoder and for another case where the encoder serves as a (24,7) decoder.

First, a description will be made of a case where the decoder serves as the (24,7) decoder corresponding to the (24,7) encoder. The (24,7) decoder receives a coded symbol stream having 24 coded symbols having a value of '+1' or '−1', encoded by the (24,7) encoder. The received code symbol stream is applied to a zero (0) inserter 650.

Meanwhile, upon receiving predetermined code length information, a controller 630 provides the (24,7) decoder with a control signal instructing it to insert '0', an intermediate value between '+1' and '−1', in the puncturing positions for the (24,7) encoder. The zero inserter 650, under the control of the controller 630, receives information on the 8 puncturing positions corresponding to the 7 input information bits from a memory 660. For example, the puncturing positions corresponding to the 7 input information bits are $0^{th}$, $4^{th}$, $8^{th}$, $12^{th}$, $16^{th}$, $20^{th}$, $24^{th}$ and $28^{th}$ symbol positions or $0^{th}$, $1^{st}$, $2^{nd}$, $3^{rd}$, $4^{th}$, $5^{th}$, $6^{th}$ and $7^{th}$ symbol positions.

Therefore, the zero inserter 650 inserts '0' in the puncturing positions provided from the memory 660 among the 24 coded symbols constituting the received coded symbol stream, and provides the zero-inserted symbol stream having 32 coded symbols to a symbol accumulator 600. The controller 630 then provides the symbol accumulator 600 with a control signal instructing it to accumulate the symbols repeated as many times as a repetition frequency of the (24,7) encoder. Since the (24,7) encoder has not performed symbol repetition, the symbol accumulator 600 outputs the 32 intact received symbols. The 32 received symbols are provided to a correlation calculator 620, and also provided to multipliers 602, 604, and 606. A mask generator 610 then generates mask function M1, M2 and M1+M2, all having a length of 32, and provides the mask function M1 to the multiplier 602, the mask function M2 to the multiplier 604 and the mask function M1+M2 to the multiplier 606. The mask functions are varied according to the puncturing positions (or the puncturing pattern). When the puncturing positions are used, the mask functions used in the encoder are used. Then, the multiplier 602 multiplies the received symbols by the mask function M1 in a symbol unit, and the multiplier 604 multiplies the received symbols by the mask function M2 in a symbol unit. Also, the multiplier 606 multiplies the received symbols by the mask function M1+M2 in a symbol unit.

A switch 652, under the control of the controller 630, provides the symbol stream output from the multiplier 602 to a correlation calculator 622. A switch 654, under the control of the controller 630, provides the symbol stream output from the multiplier 604 to a correlation calculator 624. A switch 656, under the control of the controller 630, provides the symbol stream output from the multiplier 606 to a correlation calculator 626. Then, the correlation calculator 620 calculates all correlations between the received symbol stream of length 32 and 32 Walsh codes of length 32, and provides a correlation comparator 640 with a Walsh code number having the highest correlation, a correlation value and a mask number '0' indicating that no mask function was used in the preceding stage.

The correlation calculator 622 calculates all correlations between a symbol stream determined by multiplying the received symbol stream of length 32 by the mask function M1 and the 32 Walsh codes of length 32, and provides the correlation comparator 640 with a Walsh code number having the highest correlation, a correlation value and a mask number '1' indicating the mask number is used in the preceding stage. The correlation calculator 624 calculates all correlations between a symbol stream determined by multiplying the received symbol stream of length 32 by the mask function M2 and the 32 Walsh codes of length 32, and provides the correlation comparator 640 with a Walsh code number having the highest correlation, a correlation value and a mask number '2' indicating the mask number is used in the preceding stage. The correlation calculator 626 calculates all correlations between a symbol stream determined by multiplying the received symbol stream of length 32 by the mask function M1+M2 and the 32 Walsh codes of length 32, and provides the correlation comparator 640 with a Walsh code number having the highest correlation, a correlation value and a mask number '3' indicating the mask number is used in the preceding stage. The correlation comparator 640 then selects a largest value among the values received from the correlation calculators 620, 622, 624 and 626, connects the corresponding Walsh code number and mask number, and outputs the connected value as decoded bits.

Second, a description will be made of another case where the decoder serves as the (24,4) decoder corresponding to the (24,4) encoder. The (24,4) decoder receives a coded symbol stream having 24 coded symbols having a value of '+1' or '−1', encoded by the (24,4) encoder. The received code symbol stream is applied to the zero inserter 650.

Meanwhile, upon receiving predetermined code length information, the controller 630 generates and provides the (24,4) decoder with a control signal instructing it to insert '0', an intermediate value between '+1' and '−1', in the puncturing positions for the (24,4) encoder. The zero inserter 650, under the control of the controller 630, receives information on the puncturing positions corresponding to the 4 input information bits from the memory 660. For example, the 8 puncturing positions corresponding to the 4 input information bits are $0^{th}$, $1^{st}$, $2^{nd}$, $3^{rd}$, $4^{th}$, $5^{th}$, $6^{th}$ and $16^{th}$ symbol positions. Therefore, the zero inserter 650 inserts '0' in the puncturing positions provided from the memory 660 among the 24 coded symbols constituting the received coded symbol stream, and provides the zero-inserted symbol stream having 32 coded symbols to the symbol accumulator 600. The controller 630 then provides the symbol accumulator 600 with a control signal instructing it to accumulate the symbols repeated as many times as a repetition frequency of the (24,4) encoder.

Since the (24,4) encoder has performed symbol repetition once, the symbol accumulator 600 accumulates twice the symbols in the repeated positions among the 32 received symbols, and outputs a symbol stream of length 16. The 16 received symbols output from the accumulator 600 are provided to the correlation calculator 620, and also provided to the multipliers 602, 604 and 606. The switches 652, 654 and 656 connected to output nodes of the multipliers 602, 604 and 606 are turned OFF under the control of the controller 630, so that the outputs of the multipliers 602, 604 and 606 are discarded. The controller 630 then provides the correlation calculator 620 with a control signal instructing it to calculate correlations between the received symbol stream and the Walsh codes having the same length (i.e., Walsh codes of length 16). The correlation calculator 620 then calculates all correlations between the received symbol stream of length 16 and the Walsh codes of length 16, and provides the correlation comparator 640 with a Walsh code number having the highest correlation, a correlation value, and a value indicating the mask number. The correlation comparator 640 then connects the Walsh code number and the mask number received from the correlation calculator 620, and outputs the connected value as decoded bits.

As described above, the present invention not only implements a rate indicator encoding apparatus and method having optimal performance with minimized complexity, but also uses an optimal codeword by utilizing an apparatus and method of puncturing an extended first order Reed-Muller code. Further, the present invention utilizes an apparatus and method of puncturing an extended first order Reed-Muller code, so that an inverse fast Hadamard transform is used in a decoding process, thereby making it possible to minimize hardware complexity and generate an optimal code in terms of error correcting performance. Finally, the present invention supports both the (24,4) encoder and the (24,7) encoder, thus securing efficient encoding.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An encoding method in a mobile communication system, for receiving 4 input information bits, encoding the 4 input information bits with different Walsh codes of length 16, and outputting a coded symbol stream having 24 coded symbols using a coded symbol stream having 16 coded symbols obtained by XORing the encoded input information bits by an XOR operator, comprising the steps of:

repeating the coded symbol stream having 16 coded symbols once, and thus outputting a coded symbol stream having 32 coded symbols; and puncturing $0^{th}$, $1^{st}$, $2^{nd}$, $3^{rd}$, $4^{th}$, $5^{th}$, $6^{th}$ and $16^{th}$ symbols from the 32 coded symbols, and thus outputting the coded symbol stream having 24 coded symbols.

2. An encoding method in a mobile communication system, for receiving 7 input information bits, encoding the 7 input information bits with different Walsh codes of length 32 and different masks of length 32, and outputting a coded symbol stream having 24 coded symbols using a coded symbol stream having 32 coded symbols obtained by XORing the encoded input information bits by an XOR operator, comprising the step of:

punturing $0^{th}$, $4^{th}$, $8^{th}$, $12^{th}$, $16^{th}$, $20^{th}$, $24^{th}$ and $28^{th}$ symbols from the 32 coded symbols, and thus outputting the coded symbol stream having 24 coded symbols.

3. The encoding method as claimed in claim 2, wherein the masks comprise '0111 0111 0010 0100 0110 0000 0000 0000' and '0010 0110 0101 0100 0101 0100 0100 0000'.

4. An encoding apparatus in a mobile communication system, for receiving 4 input information bits, encoding the 4 input information bits with different Walsh codes of length 16, and outputting a coded symbol stream having 24 coded symbols using a coded symbol stream having 16 coded symbols obtained by XORing the encoded input information bits by an XOR operator, comprising:

a repeater for repeating once the coded symbol stream having 16 coded symbols from the XOR operator, and thus outputting a coded symbol stream having 32 coded symbols; and a puncturer for puncturing $0^{th}$, $1^{st}$, $2^{nd}$, $3^{rd}$, $4^{th}$, $5^{th}$, $6^{th}$ and $16^{th}$ symbols from the 32 coded symbols of the coded symbol stream, and thus outputting the coded symbol stream having 24 coded symbols.

5. The encoding apparatus as claimed in claim 4, further comprising a memory for storing puncturing positions to be punctured by the puncturer, wherein the puncturing positions are $0^{th}$, $1^{st}$, $2^{nd}$, $3^{rd}$, $4^{th}$, $5^{th}$, $6^{th}$ and $16^{th}$ symbol positions.

6. An encoding apparatus in a mobile communication system, for receiving 7 input information bits, encoding the 7 input information bits with different Walsh codes of length 32 and different masks of length 32, and outputting a coded symbol stream having 24 coded symbols using a coded symbol stream having 32 coded symbols obtained by XORing the encoded input information bits by an XOR operator, comprising:

a puncturer for puncturing $0^{th}$, $4^{th}$, $8^{th}$, $12^{th}$, $16^{th}$, $20^{th}$, $24^{th}$ and $28^{th}$ symbols from the 32 coded symbols from the XOR operator, and thus outputting the coded symbol stream having 24 coded symbols.

7. The encoding apparatus as claimed in claim 6, further comprising a memory for storing puncturing positions to be punctured by the puncturer, wherein the puncturing positions are $0^{th}$, $4^{th}$, $8^{th}$, $12^{th}$, $16^{th}$, $20^{th}$, $24^{th}$ and $28^{th}$ symbol positions.

8. The encoding apparatus as claimed in claim 7, wherein the masks comprise '0111 0111 0010 0100 0110 0000 0000 0000' and '0010 0110 0101 0100 0101 0100 0100 0000'.

9. An encoding apparatus for a mobile communication system, for receiving 4 or 7 input information bits, encoding each of the 4 or 7 input information bits with different Walsh codes or masks, all having a length 16 or 32, and outputting a coded symbol stream having 24 coded symbols, comprising:

a controller for determining whether a number of input information bits is 4 or 7, and controlling an encoding operation according to the determined result;

a Walsh code generator for selectively generating 5 different Walsh codes of length 16 or 32 under the control of the controller;

a mask generator for selectively generating 2 different masks of length 16 or 32 under the control of the controller;

a plurality of multipliers for multiplying the 4 input information bits by 4 Walsh codes among the 5 Walsh codes from the Walsh code generator and outputting coded symbol streams each having 16 coded symbols, when the number of input information bits is 4, and for multiplying the 7 input information bits by the 5 Walsh codes from the Walsh code generator and the 2 masks from the mask generator and outputting coded symbol streams each having 32 coded symbols, when the number of input information bits is 7;

an XOR operator for XORing the coded symbol streams from the multipliers and outputting one coded symbol stream;

a repeater for repeating the coded symbol stream from the XOR operator a predetermined number of times under the control of the controller, and outputting a coded symbol stream having 32 coded symbols;

a memory for storing 8 puncturing positions corresponding to the 4 input information bits or 8 puncturing positions corresponding to the 7 input information bits; and a puncturer for receiving the coded symbol stream having 32 coded symbols from the repeater, puncturing coded symbols in the 8 puncturing positions read from the memory among the 32 coded symbols under the control of the controller, and outputting the coded symbol stream having 24 coded symbols, wherein, when the number of the input information bits is 4, the repeater once repeats coded symbol streams output from the XOR operator each having 16 coded symbols, and outputs coded symbol streams having 32 coded symbols, and when the number of the input information bits is 7, the repeater outputs from the XOR operator without repetition coded symbol streams each having 32 coded symbols.

10. The encoding apparatus as claimed in claim 9, wherein when the number of the input information bits is 4, the controller controls the Walsh code generator and the mask generator to generate 7 different Walsh codes and masks of length 16, sets a repetition frequency of the repeater to '1', and controls the puncturer to puncture coded symbols in the 8 puncturing positions corresponding to the 4 input information bits.

11. The encoding apparatus as claimed in claim 10, wherein the 8 puncturing positions corresponding to the 4 input information bits, stored in the memory, are $0^{th}$, $1^{st}$, $2^{nd}$, $3^{rd}$, $4^{th}$, $5^{th}$, $6^{th}$ and $16^{th}$ symbol positions.

12. The encoding apparatus as claimed in claim 9, wherein when the number of the input information bits is 7, the controller controls the Walsh code generator and the mask generator to generate 7 different Walsh codes and masks of length 32, sets a repetition frequency of the repeater to '0', and controls the puncturer to puncture coded symbols in the 8 puncturing positions corresponding to the 7 input information bits.

13. The encoding apparatus as claimed in claim 12, wherein the 8 puncturing positions corresponding to the 7 input information bits, stored in the memory, are $0^{th}$, $4^{th}$, $8^{th}$, $12^{th}$, $16^{th}$, $20^{th}$, $24^{th}$ and $28^{th}$ symbol positions.

14. The encoding apparatus as claimed in claim 13, wherein the masks comprise '0111 0111 0010 0100 0110 0000 0000 0000' and '0010 0110 0101 0100 0101 0100 0100 0000'.

15. The encoding apparatus as claimed in claim 12, wherein the 8 puncturing positions corresponding to the 7 input information bits, stored in the memory, are $0^{th}$, $1^{st}$, $2^{nd}$, $3^{rd}$, $4^{th}$, $5^{th}$, $6^{th}$ and $7^{th}$ symbol positions.

16. The encoding apparatus as claimed in claim 15, wherein the masks comprise '0000 0000 1110 1000 1101 1000 1100 0000' and '0000 0000 1100 0000 0111 1110 0010 1000'.

17. An encoding method for a mobile communication system, for receiving 4 or 7 input information bits, encoding each of the 4 or 7 input information bits with different Walsh codes or masks, all having a length 16 or 32, and outputting a coded symbol stream having 24 coded symbols, comprising the steps of:
  (a) determining whether the number of input information bits is 4 or 7;
  (b) generating 5 different Walsh codes of length 16 or 32 and 2 different masks of length 16 or 32;
  (c) encoding each of the 4 input information bits with 4 Walsh codes among the 5 Walsh codes of length 16, and outputting a coded symbol stream having 24 coded symbols by repeating and puncturing a coded symbol stream having 16 coded symbols obtained by XORing the encoded input information bits by an XOR operator, when the number of the input information bits is 4; and
  (d) encoding each of the 7 input information bits with the 5 Walsh codes of length 32 and the 2 masks of length 32, and outputting a coded symbol stream having 24 coded symbols by puncturing a coded symbol stream having 32 coded symbols obtained by XORing the encoded input information bits by the XOR operator, when the number of the input information bits is 7.

18. The encoding method as claimed in claim 17, wherein step (c) comprises the steps of:
  repeating once the coded symbol stream having 16 coded symbols, thus outputting a coded symbol stream having 32 coded symbols; and
  puncturing $0^{th}$, $1^{st}$, $2^{nd}$, $3^{rd}$, $4^{th}$, $5^{th}$, $6^{th}$ and $16^{th}$ symbols from the 32 symbols, and outputting the coded symbol stream having 24 coded symbols.

19. The encoding method as claimed in claim 17, wherein the puncturing of the step (d) comprises:
  puncturing $0^{th}$, $4^{th}$, $8^{th}$, $12^{th}$, $16^{th}$, $20^{th}$, $24^{th}$ and $28^{th}$ symbols from the 32 coded symbols, thus outputting the coded symbol stream having 24 coded symbols.

20. The encoding method as claimed in claim 17, wherein the puncturing of step (d) comprises:
  puncturing $0^{th}$, $1^{st}$, $2^{nd}$, $3^{rd}$, $4^{th}$, $5^{th}$, $6^{th}$ and $7^{th}$ symbols from the 32 coded symbols, thus outputting the coded symbol stream having 24 coded symbols.

21. An encoding method in a mobile communication system, for receiving 7 input information bits, encoding the 7 input information bits with different Walsh codes of length 32 and different mask of length 32, and outputting a coded symbol stream having 24 coded symbols using a coded symbol stream having 32 coded symbols obtained by XORing the encoded input information bits by an XOR operator, comprising the step of:
  puncturing $0^{th}$, $1^{st}$, $2^{nd}$, $3^{rd}$, $4^{th}$, $5^{th}$, $6^{th}$ and $7^{th}$ symbols from the 32 coded symbols, and outputting the coded symbol stream having 24 coded symbols.

22. The encoding apparatus as claimed in claim 21, wherein the masks comprise '0111 0111 0010 0100 0110 0000 0000 0000' and '0010 0110 0101 0100 0101 0100 0100 0000'.

23. An encoding apparatus in a mobile communication system, for receiving 7 input information bits, encoding the 7 input information bits with different Walsh codes of length 32 and different masks of length 32, and outputting a coded symbol stream having 24 coded symbols using a coded symbol stream having 32 coded symbols obtained by XORing the encoded input information bits by an XOR operator, comprising:
  a puncturer for puncturing $0^{th}$, $1^{st}$, $2^{nd}$, $3^{rd}$, $4^{th}$, $5^{th}$, $6^{th}$ and $7^{th}$ symbols 32 coded symbols from the XOR operator, and outputting the coded symbol stream having 24 coded symbols.

24. The encoding apparatus as claimed in claim 23, further comprising a memory for storing puncturing positions to be punctured by the puncturer, wherein the puncturing positions are $0^{th}$, $1^{st}$, $2^{nd}$, $3^{rd}$, $4^{th}$, $5^{th}$, $6^{th}$ and $7^{th}$ symbol positions.

25. The encoding apparatus as claimed in claim 23, wherein the masks comprise '0111 0111 0010 0100 0110 0000 0000 0000' and '0010 0110 0101 0100 0101 0100 0100 0000'.

26. An encoding apparatus in a mobile communication system, for receiving 4 or 7 input information bits, encoding the 4 or 7 input information bits with different Walsh codes or masks, all having a length of 32, and outputting a coded symbol stream having 24 coded symbols, comprising the steps of:
  a controller for determining whether the number of input information bits is 4 or 7, and controlling an encoding operation according to the determination result;
  a Walsh code generator for selectively generating 5 different Walsh codes of length 32;
  a mask generator for selectively generating 2 different masks of length 32;
  a plurality of multipliers for multiplying the 4 or 7 input information bits by the Walsh codes from the Walsh code generator and the masks from the mask generator on a one-to-one basis, and outputting coded symbol streams each having 32 coded symbols;
  an XOR operator for XORing the coded symbol streams from the multipliers and outputting one coded symbol stream;
  a memory for storing 8 puncturing positions corresponding to the 4 input information bits and 8 puncturing positions corresponding to the 7 input information bits; and
  a puncturer for receiving the coded symbol stream having 32 coded symbols from the XOR operator, puncturing coded symbols in the 8 puncturing positions read from the memory among the 32 coded symbols under the control of the controller, and outputting the coded symbol stream having 24 coded symbols.

27. The encoding apparatus as claimed in claim 26, wherein when the number of the input information bits is 4, the puncturer punctures $0^{th}$, $1^{st}$, $2^{nd}$, $3^{rd}$, $4^{th}$, $5^{th}$, $6^{th}$ and $16^{th}$ symbols corresponding to the 4 input information bits.

28. The encoding apparatus as claimed in claim 26, wherein when the number of the input information bits is 7, the puncturer punctures $0^{th}$, $4^{th}$, $8^{th}$, $12^{th}$, $16^{th}$, $20^{th}$, $24^{th}$ and $28^{th}$ symbols corresponding to the 7 input information bits.

29. The encoding apparatus as claimed in claim 26, wherein when the number of the input information bits is 7, the puncturer punctures $0^{th}$, $1^{st}$, $2^{nd}$, $3^{rd}$, $4^{th}$, $5^{th}$, $6^{th}$ and $7^{th}$ symbols corresponding to the 7 input information bits.

30. An encoding method in a mobile communication system, for receiving 4 or 7 input information bits, encoding the 4 or 7 input information bits with different Walsh codes or masks of length 32, and outputting a coded symbol stream having 24 coded symbols, comprising the steps of:

determining whether the number of the input information bits is 4 or 7;

upon receiving the 4 or 7 input information bits, encoding the 4 or 7 input information bits with different Walsh codes or masks of length 32, and outputting a coded symbol stream having 32 coded symbols obtained by XORing the encoded input information bits by an XOR operator;

upon receiving the coded symbol stream based on the 4 input information bits, puncturing $0^{th}$, $1^{st}$, $2^{nd}$, $3^{rd}$, $4^{th}$, $5^{th}$, $6^{th}$ and $16^{th}$ symbols from the 32 coded symbols constituting the coded symbol stream, and outputting the coded symbol stream having 24 coded symbols; and upon receiving the coded symbol stream based on the 7 input information bits, puncturing $0^{th}$, $4^{th}$, $8^{th}$, $12^{th}$, $16^{th}$, $20^{th}$, $24^{th}$ and $28^{th}$ symbols from the 32 coded symbols constituting the coded symbol stream, and outputting the coded symbol stream having 24 coded symbols.

31. An encoding method in a mobile communication system, for receiving 4 or 7 input information bits, encoding the 4 or 7 input information bits with different Walsh codes or masks of length 32, and outputting a coded symbol stream having 24 coded symbols, comprising the steps of:

determining whether the number of the input information bits is 4 or 7;

upon receiving the 4 or 7 input information bits, encoding the 4 or 7 input information bits with different Walsh codes or masks of length 32, and outputting a coded symbol stream having 32 coded symbols obtained by XORing the encoded input information bits by an XOR operator;

upon receiving the coded symbol stream based on the 4 input information bits, puncturing $0^{th}$, $1^{st}$, $2^{nd}$, $3^{rd}$, $4^{th}$, $5^{th}$, $6^{th}$ and $16^{th}$ symbols from the 32 coded symbols constituting the coded symbol stream, and outputting the coded symbol stream having 24 coded symbols; and upon receiving the coded symbol stream based on the 7 input information bits, puncturing $0^{th}$, $1^{st}$, $2^{nd}$, $3^{rd}$, $4^{th}$, $5^{th}$, $6^{th}$ and $7^{th}$ symbols from the 32 coded symbols constituting the coded symbol stream, and outputting the coded symbol stream having 24 coded symbols.

* * * * *